(12) United States Patent
Verseput et al.

(10) Patent No.: US 8,437,987 B2
(45) Date of Patent: May 7, 2013

(54) METHOD AND SYSTEM THAT OPTIMIZES MEAN PROCESS PERFORMANCE AND PROCESS ROBUSTNESS

(75) Inventors: Richard P. Verseput, McKinleyville, CA (US); George A. Cooney, Jr., Eureka, CA (US)

(73) Assignee: S-Matrix, Eureka, CA (US)

( * ) Notice: Subject to any disclaimer, the term of this patent is extended or adjusted under 35 U.S.C. 154(b) by 197 days.

(21) Appl. No.: 12/463,297

(22) Filed: May 8, 2009

(65) Prior Publication Data

US 2009/0216506 A1 Aug. 27, 2009
US 2010/0292967 A2 Nov. 18, 2010

Related U.S. Application Data

(63) Continuation of application No. 11/434,043, filed on May 15, 2006, now Pat. No. 7,606,685.

(51) Int. Cl.
*G06F 7/50* (2006.01)
*G06F 17/10* (2006.01)
*G06G 7/48* (2006.01)

(52) U.S. Cl.
USPC .................................................. 703/2; 703/6

(58) Field of Classification Search .................. None
See application file for complete search history.

(56) References Cited

U.S. PATENT DOCUMENTS

| | | | |
|---|---|---|---|
| 4,412,288 A | 10/1983 | Herman | |
| 5,369,566 A | 11/1994 | Pfost et al. | |
| 5,419,328 A | 5/1995 | Goh et al. | |
| 5,959,297 A | 9/1999 | Weinberg et al. | |
| 6,004,617 A | 12/1999 | Schultz et al. | |
| 6,030,917 A | 2/2000 | Weinberg et al. | |
| 6,034,775 A | 3/2000 | McFarland et al. | |
| 6,178,382 B1 | 1/2001 | Roederer et al. | |
| 6,489,168 B1 | 12/2002 | Wang et al. | |
| 6,581,012 B1 | 6/2003 | Aryev et al. | |
| 6,658,429 B2 | 12/2003 | Dorsett, Jr. | |

(Continued)

FOREIGN PATENT DOCUMENTS

| WO | WO 00/52646 | 9/2000 |
|---|---|---|
| WO | 2004038602 | 5/2004 |

OTHER PUBLICATIONS

Winton, Don. "Process Capability Studies", 1999, 16 pages.*

(Continued)

*Primary Examiner* — Suzanne Lo
(74) *Attorney, Agent, or Firm* — Sawyer Law Group, P.C.

(57) ABSTRACT

A method, system and computer readable medium are disclosed. The method, system and computer readable medium comprises providing a mathematically linked multi-step process for simultaneously determining operating conditions of a system or process that will result in optimum performance in both mean performance requirements and system robustness requirements. In a method and system in accordance with the present embodiment, the steps can be applied to any data array that contains the two coordinated data elements defined previously (independent variables and response variables), and for which a response prediction model can be derived that relates the two elements. The steps are applied to each row of the data array, and result in a predicted $C_p$ response data set. In the preferred embodiment the array is a statistically rigorous designed experiment from which mean performance prediction models can be derived for each response evaluated. The data are applied to each row of the data array.

52 Claims, 18 Drawing Sheets

U.S. PATENT DOCUMENTS

| | | |
|---|---|---|
| 6,728,641 B1 | 4/2004 | Cawse |
| 6,754,543 B1 | 6/2004 | Wold |
| 6,853,923 B2 | 2/2005 | Trygg et al. |
| 6,909,974 B2 | 6/2005 | Yung et al. |
| 6,947,953 B2 | 9/2005 | Herzenberg et al. |
| 6,996,550 B2 | 2/2006 | Wang et al. |
| 7,194,374 B2 | 3/2007 | Kobayashi et al. |
| 7,213,034 B2 | 5/2007 | Dorsett, Jr. |
| 7,427,479 B2 | 9/2008 | Karger et al. |
| 7,474,925 B2 | 1/2009 | Renner |
| 7,519,605 B2 | 4/2009 | Vailaya et al. |
| 2001/0039539 A1 | 11/2001 | Sartiel et al. |
| 2002/0156792 A1 | 10/2002 | Gombocz et al. |
| 2003/0004612 A1 | 1/2003 | Domanico et al. |
| 2003/0050763 A1 | 3/2003 | Arrit et al. |
| 2003/0149501 A1* | 8/2003 | Tuszynski ............... 700/97 |
| 2005/0026131 A1 | 2/2005 | Elzinga et al. |
| 2005/0044110 A1 | 2/2005 | Herzenberg et al. |
| 2005/0154701 A1 | 7/2005 | Parunak et al. |
| 2005/0273475 A1 | 12/2005 | Herzenberg et al. |
| 2006/0003351 A1 | 1/2006 | Karger et al. |
| 2006/0074726 A1 | 4/2006 | Forbes et al. |
| 2007/0048863 A1 | 3/2007 | Rodgers et al. |
| 2008/0137080 A1 | 6/2008 | Bodzin et al. |
| 2008/0215705 A1 | 9/2008 | Liu et al. |

OTHER PUBLICATIONS

Shabir, Ghulam. "Validation of high-performance liquid chromatography methods for pharmaceutical analysis", 2003, Journal of Chromatography, vol. 987, pp. 57-66.*

"VarTran 3.2 Tutorials: Guide to Getting Started", 2005, 32 pages.*

Sematech, "Sematech qualification plan guidelines for engineering", 1995, 106 pages.*

Kwangsun Yoon, "The Propagation of Errors in Multiple-attribute Decision Analysis: A Practical Approach", The Journal of the Operational Research Society, vol. 40, No. 7 (Jul. 1989), pp. 681-686.

Lukulay et al., "Automating HPLC and GC Analytical Method Validation", Data and Review, May 2, 2005, 5 pgs.

* cited by examiner

Select Responses for Robustness Cp Modeling

| Enabled | Responses | Confidence Interval [± 3 Sigma] | Lower Acceptance Limit | Target | Upper Acceptance Limit |
|---|---|---|---|---|---|
| ☑ | Compound 5 - Peak Retention Time | 3 | 14.90 | 15.00 | 15.10 |
| ☑ | Compound 5 - Resolution | 3 | 1.50 | 2.00 | 4.00 |
| ☑ | Compound 5 - Tailing Factor | 3 | 0.85 | 1.00 | 1.25 |
| ☐ | Compound 6 - Peak Retention Time | 3 | 0 | 0 | 0 |
| ☐ | Compound 6 - Peak Retention Time | 3 | 0 | 0 | 0 |

[Select All] [Select None]

[<< Back] [Next >>] [Finish] [Cancel] [?]

10

14

12

METHOD AND SYSTEM THAT OPTIMIZES MEAN PROCESS PERFORMANCE AND PROCESS ROBUSTNESS

CROSS-REFERENCE TO RELATED APPLICATIONS

This application is a Continuation of U.S. application Ser. No. 11/434,043, filed May 15, 2006, entitled "Method and System that Optimizes Mean Process Performance and Process Robustness", which is incorporated herein by reference.

FIELD OF THE INVENTION

The present embodiment relates generally to research, development and engineering studies and more particularly to providing optimum requirements for a designed experiment for such studies.

BACKGROUND OF THE INVENTION

Research, development, and engineering studies typically provide data sets that contain two coordinated data elements:
 One or more independent variables (study factors) at two or more levels.
 One or more associated quality attributes or performance characteristics (response variables) obtained at each level or level combination of the study factors.

Numerical analysis techniques can be applied to such coordinated data to obtain a prediction model (equation) for each response. The word prediction indicates that the model predicts the response that would be obtained at a given input level of each included study factor. Linear regression analysis is one example of a numerical analysis approach that can yield a prediction model. The simplest form of such a model is the equation of a straight line presented in Equation 1.

$$\hat{Y}=mX+b \quad \text{Equation 1}$$

In Equation 1 $\hat{Y}$ is the predicted response obtained from the model, m is the slope of the prediction line, X is an input level of the study factor, and b is a constant corresponding to the Y-intercept. The linear model presented in Equation 1 can be expanded to include any number of study factors and factor effects (e.g. interaction effects, simple curvature effects, non-linear effects, etc.). A quadratic model that includes simple pairwise interaction effects ($X_i*X_j$, $i \neq j$) and simple curvature effects ($X_i^2$) of two study factors (X1, X2) is presented in Equation 2. The quadratic model is the model underlying most commonly used statistical optimization experiment designs, also referred to as response surface designs.

$$\hat{Y}=\beta_0+\beta_1 X_1+\beta_2 X_2+\beta_{12} X_1 X_2+\beta_{11} X_1^2+\beta_{22} X_2^2 \quad \text{Equation 2}$$

The models obtained from analysis of research, development, and engineering experiments are used to obtain predicted responses at given input combinations of the study factor level settings. In this way the user can identify the study factor level settings that will most improve the responses corresponding to the prediction models. These studies are typically undertaken to meet one of two overarching improvement goals for each response:
 Mean performance goal—achieve a specific target value of the response, or a response that exceeds some minimum requirement.
 Process robustness goal—minimize variation in response quality attributes or performance characteristics over time.

A statistically designed experiment is the most rigorous and correct approach to obtaining accurate response prediction models from which the study factor level settings that most improve the response(s) can be determined. To illustrate, consider a batch drug synthesis process that consists of three process parameters (study factors): the process operating time per batch (run time), the mixing speed of the rotor in the material blending tank (stir rate), and the temperature maintained in the blending tank (mixing temp.). These process parameters are presented in Table 1, along with their current operating setpoint levels and appropriate study ranges for a statistical optimization experiment.

TABLE 1

| Process Control Parameter (Study Factor) | Current Process Operating Setpoint | Experiment Range Around Setpoint |
|---|---|---|
| Run time (minutes) | 40 | 30-50 |
| Stir rate (rpm) | 14 | 8-20 |
| Mixing temp. (Deg. C.) | 50 | 40-60 |

For this process the critical response is the measured amount of drug produced (% Yield). To quantitatively define the effects of changes to the three process parameters on the % yield response requires conducting a statistically designed experiment in which the parameters are varied through their ranges in a controlled fashion. A typical response surface experiment to study the three process parameters would require 17 experiment runs—eight runs that collectively represent lower bound and upper bound level setting combinations, six runs that collectively represent combinations of the lower bound and upper bound of one variable with the midpoints of the other two variables, and three repeat runs of the current process operating setpoints (range midpoints). This experiment design is shown in Table 2 (in non-random order).

TABLE 2

| Experiment Run | Run Time (minutes) | Stir Rate (rpm) | Mixing Temp. (Deg. C.) |
|---|---|---|---|
| Run 1 | 30 | 8 | 40 |
| Run 2 | 50 | 8 | 40 |
| Run 3 | 30 | 20 | 40 |
| Run 4 | 50 | 20 | 40 |
| Run 5 | 30 | 8 | 60 |
| Run 6 | 50 | 8 | 60 |
| Run 7 | 30 | 20 | 60 |
| Run 8 | 50 | 20 | 60 |
| Run 9 | 30 | 14 | 50 |
| Run 10 | 50 | 14 | 50 |
| Run 11 | 40 | 8 | 50 |
| Run 12 | 40 | 20 | 50 |
| Run 13 | 40 | 14 | 40 |
| Run 14 | 40 | 14 | 60 |
| Run 15 | 40 | 14 | 50 |
| Run 16 | 40 | 14 | 50 |
| Run 17 | 40 | 14 | 50 |

Assuming reasonably good data, analysis of the response surface experiment results can provide accurate quadratic prediction models for each response evaluated in the study. These models can then be used to identify the study factor level settings that will most improve the responses.

Process Robustness Goal

A statistically designed experiment is the most rigorous and correct approach to accurately defining the process robustness associated with any given measured response. To illustrate, consider again the batch drug synthesis process described previously. The process parameters are again presented in Table 3, along with their current operating setpoint levels and study ranges. However, note that in this case each study range is defined by the variation around the parameter's setpoint expected during normal operation (random error range).

TABLE 3

| Process Control Parameter (Study Factor) | Current Process Operating Setpoint | Expected Variation Around Setpoint |
|---|---|---|
| Run time (minutes) | 40 | 38-42 |
| Stir rate (rpm) | 14 | 13.5-14.5 |
| Mixing temperature (Deg. C.) | 50 | 49.5-50.5 |

To quantitatively define process robustness for the % yield response at the defined parameter setpoints (current operating setpoints in this case) requires conducting a statistically designed experiment in which the parameters are varied through their error ranges in a controlled fashion. A typical statistical experiment to define robustness for the three parameters would require 11 experiment runs—eight runs that collectively represent all combinations of the error range lower and upper bound settings, and three repeat runs of the current process operating setpoints. This experiment design is shown in Table 4 (in non-random order).

TABLE 4

| Experiment Run | Run Time (minutes) | Stir Rate (rpm) | Mixing Temp. (Deg. C.) |
|---|---|---|---|
| Run 1 | 38 | 13.5 | 49.5 |
| Run 2 | 42 | 13.5 | 49.5 |
| Run 3 | 38 | 14.5 | 49.5 |
| Run 4 | 42 | 14.5 | 49.5 |
| Run 5 | 38 | 13.5 | 50.5 |
| Run 6 | 42 | 13.5 | 50.5 |
| Run 7 | 38 | 14.5 | 50.5 |
| Run 8 | 42 | 14.5 | 50.5 |
| Run 9 | 40 | 14 | 50 |
| Run 10 | 40 | 14 | 50 |
| Run 11 | 40 | 14 | 50 |

Again assuming reasonably good data, analysis of the robustness experiment can define the effect on the responses evaluated of each of the process parameters studied, individually and in combination. The magnitude of their cumulative effects on the response is an indirect indication of the process robustness at the one defined parameter setpoint combination.

It must be understood that analysis of the % yield data obtained from the statistically designed robustness experiment presented in Table 4 can only define the process robustness for % yield associated with the current setpoint level setting combination of the process parameters. There are two critical limitations in the information available from the experiment:

1. The experiment ranges of the variables are those expected due to random error. The ranges are therefore too small to provide the data from which an accurate prediction model of the % yield response can be developed. This same problem is inherent in the analysis of historical data sets, as will be discussed shortly.

2. The data obtained from the designed experiment can not be used to predict what the process robustness for % yield will be at any other level setting combination of the process parameters.

To address the process robustness goal, historical data are sometimes used as an alternative to a designed experiment. However, this approach is extremely unlikely to provide an acceptable result due to the statistical inadequacy of most historical data sets. Put simply, quantitatively defining robustness requires development of accurate response prediction models. Historical data are obtained from monitoring process operation and output over time. In these data the changes to the process operating parameters during process operation are not done in a controlled fashion. Instead, the changes are due to random variation in the process parameters about their setpoints (random error). It is normally not possible to obtain accurate prediction models from such data sets due to two fundamental flaws:

1. The response variation is due to random error variation in the process parameters. Therefore the magnitudes of the response changes are small—normally in the range of measurement error, and so can not be accurately modeled. This condition is referred to as low signal-to-noise ratio.

2. The process parameters are varied in an uncontrolled fashion. This normally results in data sets in which the process parameters are not represented as independent. The lack of independence severely compromises the ability to develop accurate response prediction models.

Another alternative approach to using a designed experiment is to conduct a simulation study using Monte Carlo methods. In this approach a random variation data set is first created for each process parameter; the random setpoint combinations are then input into a mean performance model to generate a predicted response data set. The final step involves statistically characterizing the response data set distribution and using that result to define the process robustness, again at the defined parameter setpoints. This is an extremely computationally intensive approach, and suffers the same two limitations presented above for the statistically designed process robustness experiment.

Current Practice—Sequential Experimentation

As the discussion above points out, both the statistically designed process robustness experiment and the Monte Carlo simulation approach only define the response robustness at a single set of conditions. Therefore, to meet both the mean performance goal and the process robustness goal simultaneously, a complete statistical robustness experiment must be carried out at each set of process parameter conditions (each experiment run) in the statistical optimization experiment. This would require 187 experiments (17×11). This is almost universally impractical. Therefore, the two experiment goals are normally addressed sequentially.

In the sequential approach the mean performance goal experiment is conducted first, and the response prediction models are used to define the optimum process parameter settings. The process robustness goal experiment is then carried out to define the robustness at the optimum process parameter settings. There is obviously a tremendous limitation to this approach:

When the optimum process parameter settings addressed in the process robustness experiment do not meet the robustness goal, the experimenter must start over. However, time and budget restrictions invariably do not allow for additional iterations of the sequential experiment approach. The result is that most process systems are sub-optimal in terms of robustness, and the consequence is a major cost in terms of significant process output being out of specification Accordingly, what is needed is a system and method to overcome the above-identified issues. The present invention addresses these needs.

SUMMARY OF THE INVENTION

A method, system and computer readable medium are disclosed. The method, system and computer readable medium comprises providing a mathematically linked multi-step process for simultaneously determining operating conditions of a system or process that will result in optimum performance in both mean performance requirements and system robustness requirements. In a method and system in accordance with the present embodiment, the steps can be applied to any data array that contains the two coordinated data elements defined previously (independent variables and response variables), and for which a response prediction model can be derived that relates the two elements. The steps are applied to each row of the data array, and result in a predicted $C_p$ response data set. In the preferred embodiment the array is a statistically rigorous designed experiment from which mean performance prediction models can be derived for each response evaluated. The data are applied to each row of the data array.

1. Create the parameter-based propagation-of-error matrix template (PPOE template) based on the experiment variables and their associated control limits.

2. Using the PPOE template generate the joint probability of occurrence matrix ($P_j$ matrix) by computing a $P_j$ value for each PPOE template combination of the experiment variables.

3. Using the PPOE template generate a response prediction matrix ($Y_{pred}$ matrix) by computing a $Y_{pred}$ value for each PPOE template combination of the experiment variables.

4. Transform acceptance limits (±AL) defined on a relative scale for the response to actual lower and upper acceptance limits (LAL and UAL) around the $Y_{pred}$ calculated for the setpoint level settings of the variables in preparation of calculating the $C_p$.

5. For each element in the $Y_{pred}$ matrix, center the response prediction model error distribution about the mean predicted value and calculate the proportional amount of the distribution that is outside the response acceptance limits.

6. Transform the data distribution of the $\phi$ matrix values from a uniform distribution to a Gaussian distribution. This is done by weighting each of the $\phi i$ values by its corresponding joint probability of occurrence.

7. Calculate the failure rate at setpoint (FRSP). The FRSP is the proportion of the predicted response distribution that is outside the acceptance limits.

8. Calculate the standard deviation of the predicted response distribution using the FRSP calculated in step 7 above.

9. Calculate the confidence interval of the predicted response distribution ($CI_{prd}$).

10. Calculate the $C_p$ for a given row in the data array using the $CI_{prd}$ obtained in step 9 and the actual response acceptance limits obtained in step 4.

DETAILED DESCRIPTION

The present embodiment relates generally to research, development and engineering studies and more particularly to providing optimum requirements for a designed experiment for such studies. The following description is presented to enable one of ordinary skill in the art to make and use the embodiment and is provided in the context of a patent application and its requirements. Various modifications to the preferred embodiments and the generic principles and features described herein will be readily apparent to those skilled in the art. Thus, the present embodiment is not intended to be limited to the embodiments shown, but is to be accorded the widest scope consistent with the principles and features described herein.

DEFINITIONS

This discussion employs as illustrating examples the study factors controlling the solvent blend (mobile phase) used in a high-performance liquid chromatograph (HPLC). The experiment variables are the concentration of the organic solvent in the blend (% organic) and the rate of flow of the solvent blend through the HPLC system (pump flow rate). The response variable is the measured percent of an active pharmaceutical ingredient in a sample (% API).

1. Experiment Variable ($X_i$).

This is also referred to an independent variable or a study factor. It is a settable parameter of the system or process under study.

2. Mean Experiment Variable Level ($x_i$).

Figure 1:
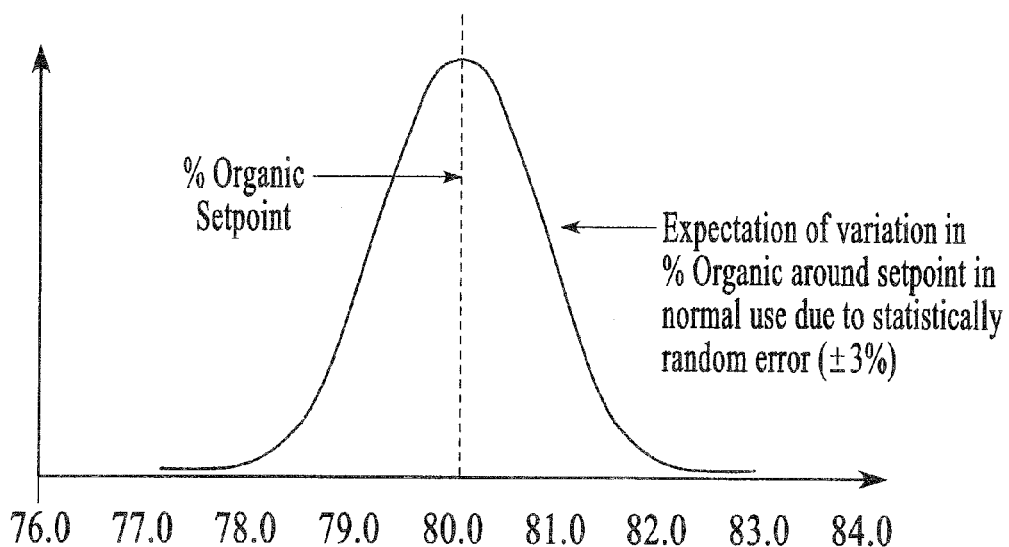
FIG. 1 is a graph showing expectation of variation around the setpoint.

Each experiment variable, designated $X_i$, will have a level setting, designated $x_i$, in each experiment design run. For each variable the $x_i$ level setting in the design run is defined as the setpoint (mean value) of the variable $X_i$ distribution. The setpoint and distribution are pictured in FIG. 1A. The variable $X_i$ distribution is defined below.

3. Variable $X_i$ Error Distribution

The $X_i$ error distribution is the distribution of experiment variable level settings around the setpoint ($x_i$) due to random variation during normal operation (random error).

Lower control limit=LCL
Upper control limit=UCL

Figure 2:
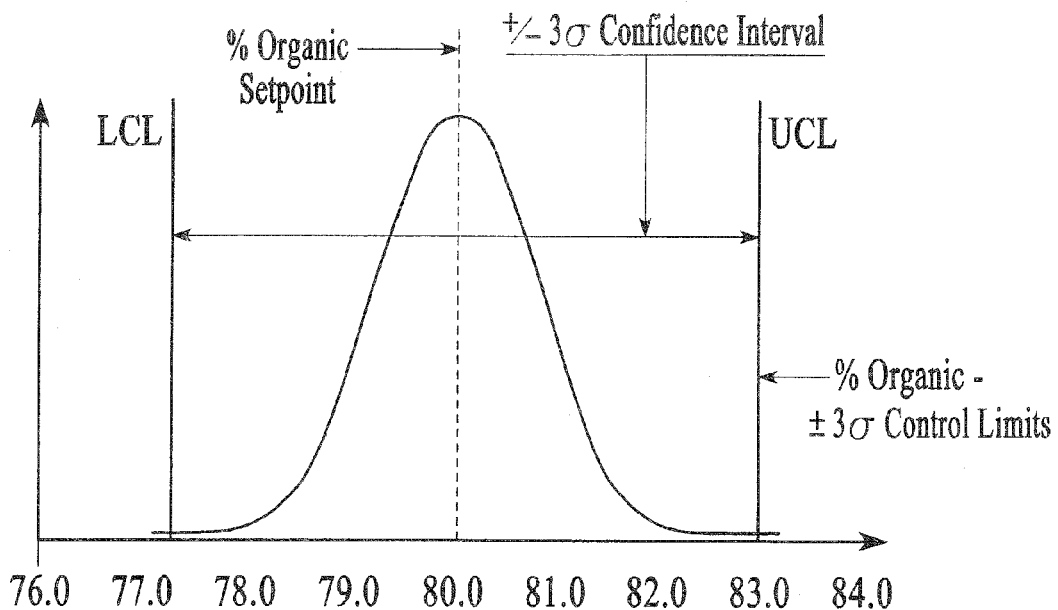
FIG. 2 presents the LCL and UCL values around a % organic setpoint of 80%.

The LCL and UCL are the lower and upper bounds, respectively on the $X_i$ error distribution. The LCL and UCL values around a given setpoint level setting for each experiment variable are based on the expectation of the maximum variation around the setpoint over time under normal operation. In this embodiment the values are based on the ±3σ a confidence interval of a normally-distributed error. In other embodiments they could be based on other confidence intervals (e.g. ±1σ, ±2σ, . . . , ±6σ). FIG. 2 presents the LCL and UCL values around a % organic setpoint of 80%.

The preferred embodiment assumes that variation about the $x_i$ level settings (setpoints) of the experiment variables is due to random error alone—all errors are normal Gaussian, independent and identically distributed (IID). However, the IID assumption is not required. The variation of each $x_i$ can be independently estimated from experimental data, historical records, etc., and the characterized variation distribution can then be the basis of the control limits defined for variable $X_i$.

Figure 3:
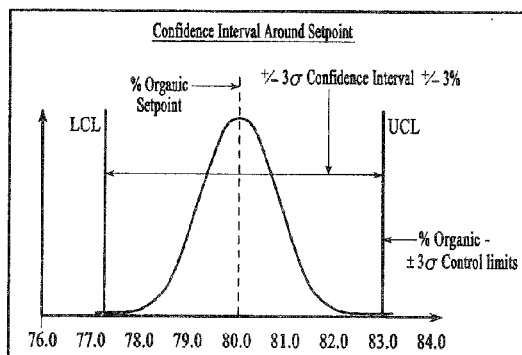
FIG. 3 presents a software dialog that enables input of the expectation of the maximum variation around setpoint over time under normal operation.

FIG. 3 presents a software dialog that enables input of the expectation of the maximum variation around setpoint over time under normal operation. In this dialog the input for each variable is the ±3σ confidence interval associated with the expected error distribution. Using the expectation of error illustrated in FIG. 2, the ±3σ confidence interval that would be input for % organic would be ±3.00 (UCL minus LCL).

1. Parameter-Based Propagation-of-Error Matrix Template (PPOE Template)

Given the $x_i$ setpoints of the experiment variables in a given design run ($x_{i1}$, $x_{i2}$, . . . , $x_{in}$), the PPOE template is an n-dimensional array template of all possible level-setting combinations of the variables in which the level settings of each variable used in combination are the 0.5σ increment values along the −3σ to +3σ setting interval about the $x_i$ setpoint, as defined by the ±3σ confidence interval.

For example, given the two variables pump flow rate and % organic, with setpoint levels and ±3σ confidence intervals of 1.00±0.15 mL/min and 80±3.0%, respectively, the PPOE template of all possible level setting combinations would yield the 2-dimensional array template presented in Table 5. Note that this is not limited to two dimensions, and an array can be generated for any number of experiment variables.

TABLE 5

Parameter-based propagation of error matrix template (PPOE template)

| | | % Organic | | | | | | | | | | | | |
|---|---|---|---|---|---|---|---|---|---|---|---|---|---|---|
| | | 77.0 | 77.5 | 78.0 | 78.5 | 79.0 | 79.5 | 80.0 | 80.5 | 81.0 | 81.5 | 82.0 | 82.5 | 83.0 |
| Pump Flow Rate | 0.85 | | | | | | | | | | | | | |
| | 0.88 | | | | | | | | | | | | | |
| | 0.90 | | | | | | | | | | | | | |
| | 0.93 | | | | | | | | | | | | | |
| | 0.95 | | | | | | | | | | | | | |
| | 0.98 | | | | | | | | | | | | | |
| | 1.00 | | | | | | | | | | | | | |
| | 1.03 | | | | | | | | | | | | | |
| | 1.05 | | | | | | | | | | | | | |
| | 1.08 | | | | | | | | | | | | | |
| | 1.10 | | | | | | | | | | | | | |
| | 1.13 | | | | | | | | | | | | | |
| | 1.15 | | | | | | | | | | | | | |

In the preferred embodiment the PPOE template is generated using the balanced mixed level design type. This design type allows process robustness estimation to be based on the same data construct in all cases for all independent variables. The large size of this design is not a problem, nor is any lack of ability to achieve any of the variable level setting combinations in the template, since the matrix is a "virtual design" used for simulation calculations and will not actually be carried out.

In the preferred embodiment the structure of the PPOE template is based on the previously stated assumption that the variations about the $x_i$ level settings (setpoints) of the experiment variables are normal Gaussian errors, independent and identically distributed (IID). However, the assumption is not required. As stated, a characterized variation distribution of each $x_i$ can be the basis of the PPOE template structure.

2. Response Variable ($Y_i$)

This is also referred to as a dependent variable. This is a quality attribute or performance characteristic measured on the final process output or at a point in the process.

3. Response Variable Target ($T_i$)

This is the desired value of the response variable.

4. Mean Response Variable Level ($y_i$)

Each response, designated $Y_i$, will have a level setting, designated $y_i$, associated with each design run. For each response the $y_i$ level is defined as the "mean" value of the $Y_i$ distribution. The mean response and response distribution are pictured in FIG. 4. The response $Y_i$ distribution is defined below.

5. Response $Y_i$ Distribution

This is the distribution of response values about the mean response ($y_i$) due to the random variations in the $X_i$ variables occurring during normal operation.

Lower confidence limit=LCL
Upper confidence limit=UCL

Figure 4:
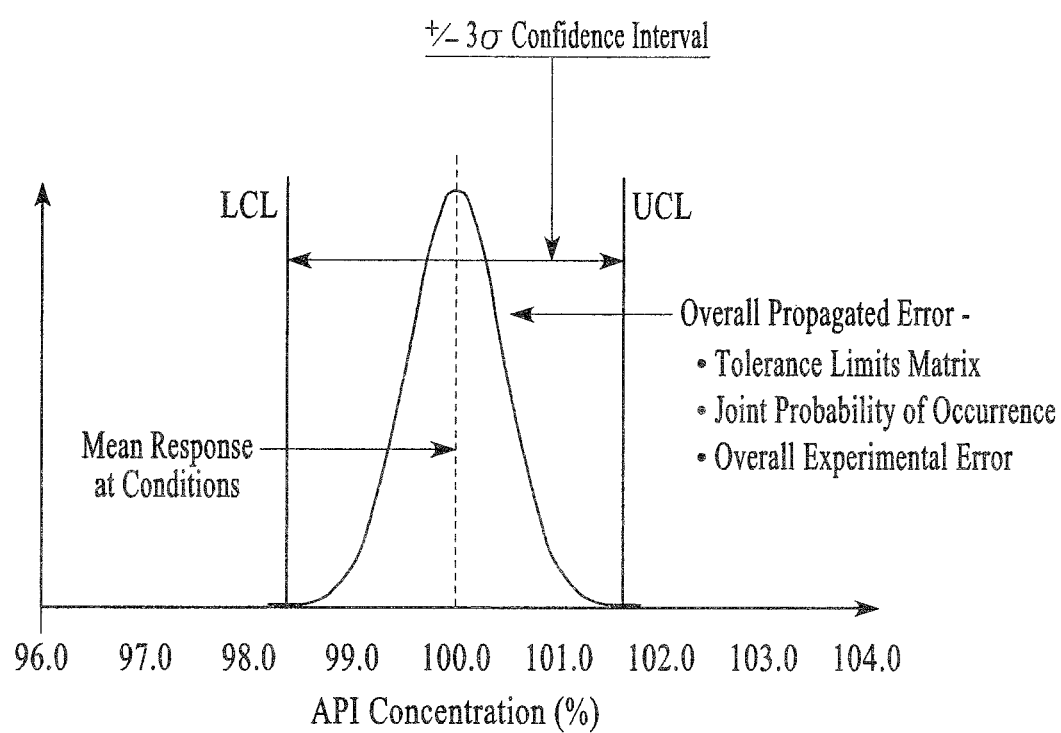
FIG. 4 is a graph showing estimated variation around mean response.

These values are defined by the prediction confidence interval of the response $Y_i$ distribution on which the process robustness estimate is to be based. FIG. 4 presents these bounds obtained when the response $Y_i$ distribution is located about a % API target of 100% using a ±3σ confidence interval of ±1.50.

Lower acceptance limit=LAL
Upper acceptance limit=UAL

These are the minimum and maximum acceptable values of a given response variable ($Y_i$). In normal operation process output that falls outside these limits would be rejected.

Note: these values are also referred to as specifications limits and tolerance limits.

Figure 5:
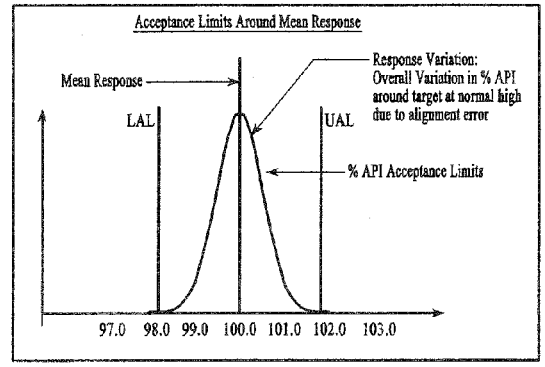
FIG. 5 presents a software dialog that enables input of the confidence interval on which the robustness estimate is to be based for each response.
Figure 6:
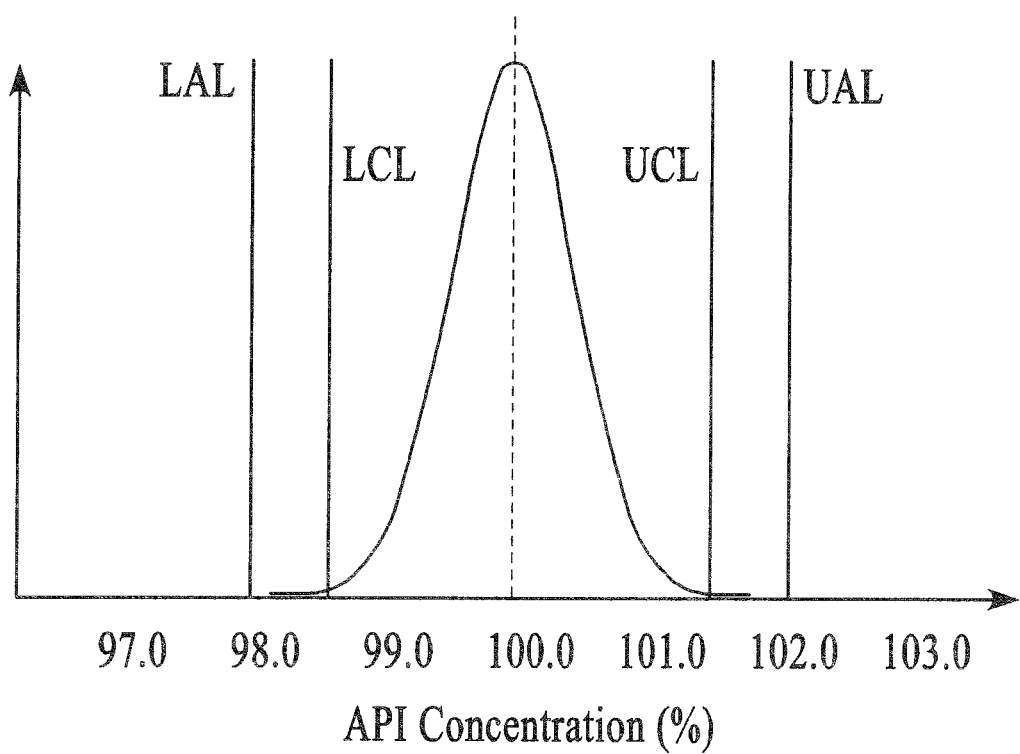
FIG. 6 presents confidence limits and acceptance limits for the % API response.

FIG. 5 presents a software dialog that enables input of the confidence interval on which the robustness estimate is to be based for each response. The dialog also enables input of the associated LAL, UAL, and $T_i$ values for each response. The confidence limits and acceptance limits are presented in FIG. 6 for the % API response based on a $T_i$ of 100%, a ±3σ confidence interval of ±1.50, and acceptance limits of ±2.00%.

1. Process Capability ($C_p$)

This is a direct, quantitative measure of process robustness used routinely in statistical process control (SPC) applications. The classical SPC definition of "inherent process capability" ($C_p$) is:

$$C_p = \frac{UTL - LTL}{6\sigma \text{ variation}}$$

where UTL and LTL=tolerance (product specification) limits, and 6σ variation=±3σ process output variation. In this embodiment we simply substitute the nomenclature acceptance limits for tolerance limits. The traditional goal for $C_p$ is described below.

$C_p$ goal≧1.33 (standard goal based on setting the UTL and LTL at ±4σ of process output variation).

When $C_p$ is below 1.00, probability of Type I error (α) becomes significant.

α=$P$(type I error)=$P$(reject $H_0|H_0$ is true)

β=$P$(type II error)=$P$(fail to reject $H_0|H_0$ is false)

Figure 7:
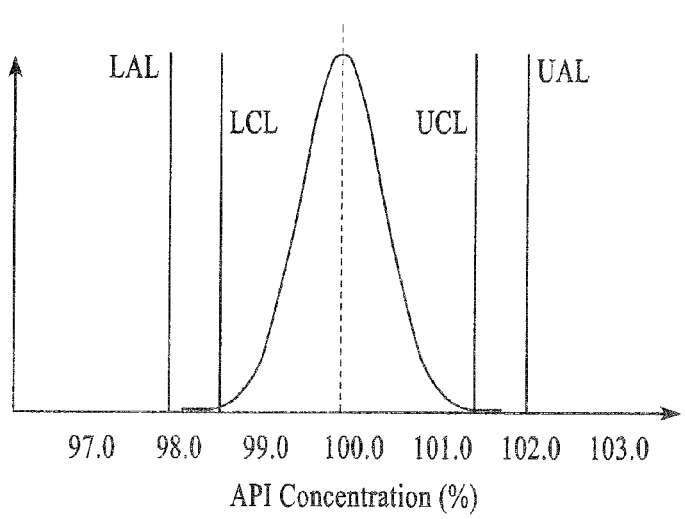
FIG. 7 shows the $C_p$ calculations for the % API response.

FIG. 7 shows the $C_p$ calculations for the % API response based on a $T_i$ of 100%, a ±3σ confidence interval of ±1.50, and acceptance limits of ±2.00%.

Embodiment

This document describes a new embodiment in the form of a methodology that overcomes (1) the statistical deficiencies associated with historical data sets, and (2) the common failing of the sequential experimental approach without requiring the extremely large amount of work that would otherwise be required. The methodology provides the ability to optimize study factors in terms of both mean performance and process robustness in a single experiment that requires no additional experiment runs beyond the number required of a typical statistically designed mean response experiment.

The methodology includes computational approaches that are statistically superior to, and more defensible than, traditional approaches. Relative to traditional simulation approaches, the methodology is tremendously more computationally efficient overall, and eliminates the need for the computational steps required to characterize predicted response data distributions.

The methodology contains three key elements: up-front definition of performance-driven robustness criteria, a rigorous and defensible experiment design strategy, and statistically valid data analysis metrics for both mean performance and process robustness. The methodology includes the 10-step process providing this information.

Figure 8A:
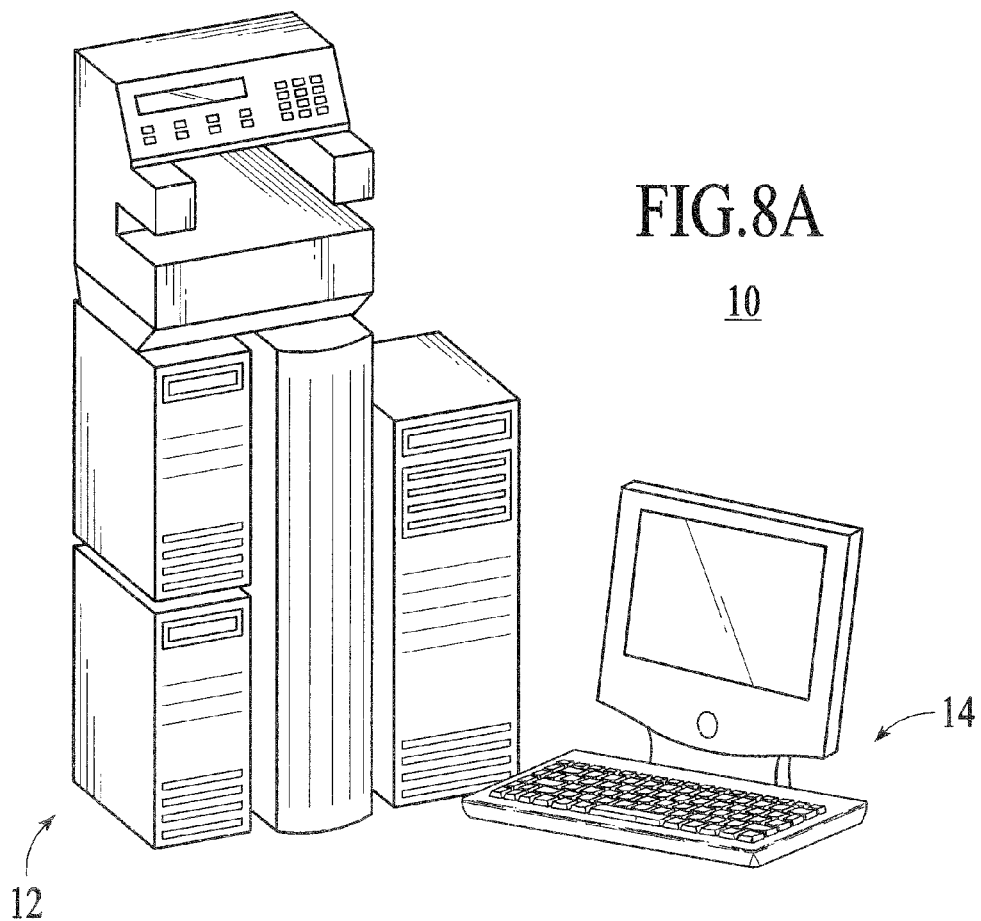
FIG. 8A is a typical system which implements the software in accordance with the embodiment.

FIG. 8A is a typical system 10 which implements the software in accordance with the embodiment. The system 10 includes an embodiment 12 coupled to a processing system 14.

In one embodiment, the methodology is implemented in the form of computer software that automates research, development, and engineering experiments. This document describes a typical embodiment in the application context of developing a high-performance liquid chromatography (HPLC) analytical method. In this embodiment the software that executes the invention is integrated within software that automates HPLC method development experiments.

FDA and ICH guidance documents addressing chromatographic analytical method development state that a best practices approach to method development incorporates robustness into the method development process. This is a qualitative guidance statement—as no standard experimental methodology to accomplish this "best practices" approach is available, none is referenced in the guidance documents. In the embodiment a best practices approach is automated that conform to regulatory guidances through statistically rigorous and defensible analytical method development experimentation that incorporates robustness using quantitative process capability based metrics. To describe the features of the present invention in more detail, refer now to the following description in conjunction with the accompanying figures.

Figure 8B:
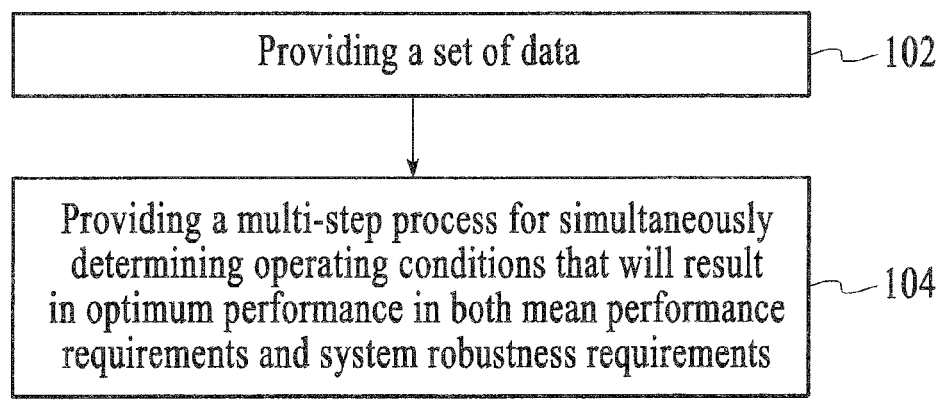
FIG. 8B is a flow chart illustrating the operation of a method in accordance with the present invention.

FIG. 8B is a flow chart illustrating the operation of a method in accordance with the present invention. First, provide a first set of data, via step 102. Next, provides a multi-step mathematical process for simultaneously determining operating conditions of a system or process that will result in optimum performance for both mean performance requirements and robustness requirements, via step 104.

Procedure

Below is a summary of the calculation steps associated with the multi-step process described above. The steps can be applied to any data array that contains the two coordinated data elements defined previously (independent variables and response variables), and for which a response prediction model can be derived that relates the two elements. The steps are applied to each row of the data array, and result in a predicted $C_p$ response data set. In the preferred embodiment the array is a statistically rigorous designed experiment from which mean performance prediction models can be derived for each response evaluated.

1. Create the parameter-based propagation-of-error matrix template (PPOE template) based on the experiment variables and their associated control limits.

2. Using the PPOE template generate the joint probability of occurrence matrix ($P_j$ matrix) by computing a $P_j$ value for each PPOE template combination of the experiment variables.

3. Using the PPOE template generate a response prediction matrix ($Y_{pred}$ matrix) by computing a $Y_{pred}$ value for each PPOE template combination of the experiment variables.

4. Transform acceptance limits (±AL) defined on a relative scale for the response to actual lower and upper acceptance limits (LAL and UAL) around the $Y_{pred}$ calculated for the setpoint level settings of the variables in preparation of calculating the $C_p$.

5. For each element in the $Y_{pred}$ matrix, center the response prediction model error distribution about the mean predicted value and calculate the proportional amount of the distribution that is outside the response acceptance limits.

6. Transform the data distribution of the φ matrix values from a uniform distribution to a Gaussian distribution. This is done by weighting each of the φi values by its corresponding joint probability of occurrence.

7. Calculate the failure rate at setpoint (FRSP). The FRSP is the proportion of the predicted response distribution that is outside the acceptance limits.

8. Calculate the standard deviation of the predicted response distribution using the FRSP calculated in Step 7 above.

9. Calculate the confidence interval of the predicted response distribution ($CI_{prd}$).

10. Calculate the $C_p$ for a given row in the data array using the $CI_{prd}$ obtained in Step 9 and the actual response acceptance limits obtained in Step 4.

The following pages contain a detailed presentation of the calculations associated with an embodiment. The detailed presentation employs an example analytical method development study involving a high-performance liquid chromatograph (HPLC) in an embodiment. The experiment variables in the study are pump flow rate and % organic, with mean variable levels and ±3σ control limits in a given design run of 1.00±0.15 mL/min. and 80±3.0%, respectively. The response variable is the measured USP resolution (USP-Res) between an active pharmaceutical ingredient and a degradant. The experiment design matrix used in the study is presented below.

| Example Design-Response Matrix | | |
|---|---|---|
| Run No. | Pump Flow Rate | % Organic |
| 1 | 1 | 92.5 |
| 2 | 1 | 67.5 |

| Example Design-Response Matrix (continued) | | |
|---|---|---|
| Run No. | Pump Flow Rate | % Organic |
| 3 | 0.5 | 92.5 |
| 4 | 0.75 | 73.75 |
| 5 | 1.5 | 67.5 |
| 6 | 1.25 | 86.25 |
| 7 | 1.5 | 92.5 |
| 8 | 1.5 | 67.5 |
| 9 | 0.5 | 80 |
| 10 | 1 | 80 |
| 11 | 1.5 | 92.5 |
| 12 | 0.5 | 67.5 |
| 13 | 1.25 | 73.75 |
| 14 | 0.5 | 80 |
| 15 | 1.5 | 80 |

Step 1. Create the parameter-based propagation-of-error matrix template (PPOE template) based on the experiment variables and their associated control limits.

An example dialog for user input of experiment variable control limits is presented in FIG. 3.

As an example, given two experiment variables pump flow rate and % organic, with mean variable levels and ±3σ control limits in a given design run of 1.00±0.15 mL/min. and 80±3.0%, respectively, the PPOE template of all possible level setting combinations would yield the 2-dimensional array template presented in Table 6.

TABLE 6

| PPOE template | | | | | | | | | | | | | |
|---|---|---|---|---|---|---|---|---|---|---|---|---|---|
| | | % Organic | | | | | | | | | | | |
| | | 77.0 | 77.5 | 78.0 | 78.5 | 79.0 | 79.5 | 80.0 | 80.5 | 81.0 | 81.5 | 82.0 | 82.5 | 83.0 |
| Pump Flow Rate | 0.85 | | | | | | | | | | | | | |
| | 0.88 | | | | | | | | | | | | | |
| | 0.90 | | | | | | | | | | | | | |
| | 0.93 | | | | | | | | | | | | | |
| | 0.95 | | | | | | | | | | | | | |
| | 0.98 | | | | | | | | | | | | | |
| | 1.00 | | | | | | | | | | | | | |
| | 1.03 | | | | | | | | | | | | | |
| | 1.05 | | | | | | | | | | | | | |
| | 1.08 | | | | | | | | | | | | | |
| | 1.10 | | | | | | | | | | | | | |
| | 1.13 | | | | | | | | | | | | | |
| | 1.15 | | | | | | | | | | | | | |

Figure 8C:
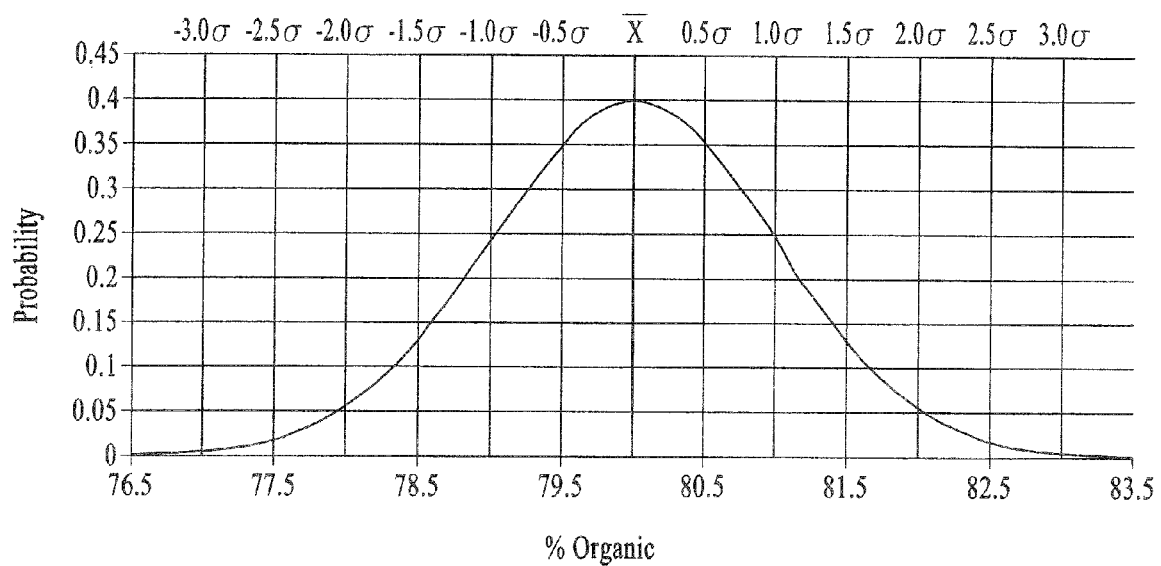
FIG. 8C is a graph which shows normal probability distribution around % organic set point.

To illustrate, consider the % organic variable having a mean level $x_i$ of 80.0% and ±3σ control limits of ±3.0% in a given design run. Applying a normal probability distribution to the variable with distribution parameters $\bar{X}=80\%$ and ±3σ limits=±3.0% yields the graph shown in FIG. 8C. Notice that the % organic levels of 77.0% and 83.0% are at the −3.0σ and +3.0σ limits, respectively.

Step 2. Using the PPOE template generate the joint probability of occurrence matrix ($P_j$ matrix) by computing a $P_j$ value for each PPOE template combination of the experiment variables.

Calculate the joint probability of occurrence ($P_j$) of each level setting combination of the experiment variables in the PPOE template. When the error distributions associated with the variables are independently distributed, $P_j$ is the simple product of the individual probabilities associated with the level of each variable in a given combination. The individual probability of occurrence ($P_{i,\ i=1,\ 2,\ \ldots,\ n}$) associated with a given experiment variable level setting in the PPOE template, the variation in which follows a Gaussian (normal) distribution, is defined as:

$$P_i = \frac{0.5 * e^{-\left(\frac{(x-X)}{\sigma}\right)^2/2}}{\sqrt{2 * \pi}}$$

To illustrate using the HPLC method development experiment example, the $P_1$ associated with a pump flow rate of 0.85 mL/min (with $1\sigma = \pm 0.05$) is:

$$P_1 = \frac{0.5 * e^{-\left(\frac{(0.85-1.00)}{0.05}\right)^2/2}}{\sqrt{2 * \pi}} = 0.002216$$

$P_2$ associated with a % organic of 77% (with $1\sigma = \pm 1.00$) is:

$$P_2 = \frac{0.5 * e^{-\left(\frac{(77.0-80.0)}{1.0}\right)^2/2}}{\sqrt{2 * \pi}} = 0.002216$$

$P_j$ is the simple product of the individual probabilities ($P_1$ and $P_2$), which is:

$$P_j = P_1 * P_2 = 0.002216 * 0.002216 = 0.000005$$

Generating the joint probability of occurrence for each element of the PPOE template in the manner described above yields the $P_j$ matrix presented in Table 7.

TABLE 7

Joint probability matrix ($P_j$ matrix)

| | | % Organic | | | | | | |
|---|---|---|---|---|---|---|---|---|
| | | 77.0 | 77.5 | 78.0 | 78.5 | 79.0 | 79.5 | 80.0 |
| Pump Flow Rate | 0.85 | 0.000005 | 0.000019 | 0.000060 | 0.000144 | 0.000268 | 0.000390 | 0.000442 |
| | 0.88 | 0.000019 | 0.000077 | 0.000237 | 0.000568 | 0.001060 | 0.001543 | 0.001748 |
| | 0.90 | 0.000060 | 0.000237 | 0.000729 | 0.001748 | 0.003266 | 0.004752 | 0.005385 |
| | 0.93 | 0.000144 | 0.000568 | 0.001748 | 0.004194 | 0.007835 | 0.011400 | 0.012918 |
| | 0.95 | 0.000268 | 0.001060 | 0.003266 | 0.007835 | 0.014637 | 0.021297 | 0.024133 |
| | 0.98 | 0.000390 | 0.001543 | 0.004752 | 0.011400 | 0.021297 | 0.030987 | 0.035113 |
| | 1.00 | 0.000442 | 0.001748 | 0.005385 | 0.012918 | 0.024133 | 0.035113 | 0.039789 |
| | 1.03 | 0.000390 | 0.001543 | 0.004752 | 0.011400 | 0.021297 | 0.030987 | 0.035113 |
| | 1.05 | 0.000268 | 0.001060 | 0.003266 | 0.007835 | 0.014637 | 0.021297 | 0.024133 |
| | 1.08 | 0.000144 | 0.000568 | 0.001748 | 0.004194 | 0.007835 | 0.011400 | 0.012918 |
| | 1.10 | 0000060 | 0.000237 | 0.000729 | 0.001748 | 0.003266 | 0.004752 | 0.005385 |
| | 1.13 | 0.000019 | 0.000077 | 0.000237 | 0.000568 | 0.001060 | 0.001543 | 0.001748 |
| | 1.15 | 0.000005 | 0.000019 | 0.000060 | 0.000144 | 0.000268 | 0.000390 | 0.000442 |

| | | % Organic | | | | | |
|---|---|---|---|---|---|---|---|
| | | 80.5 | 81.0 | 81.5 | 82.0 | 82.5 | 83.0 |
| Pump Flow Rate | 0.85 | 0.000390 | 0.000268 | 0.000144 | 0.000060 | 0.000019 | 0.000005 |
| | 0.88 | 0.001543 | 0.001060 | 0.000568 | 0.000237 | 0.000077 | 0.000019 |
| | 0.90 | 0.004752 | 0.003266 | 0.001748 | 0.000729 | 0.000237 | 0.000060 |
| | 0.93 | 0.011400 | 0.007835 | 0.004194 | 0.001748 | 0.000568 | 0.000144 |
| | 0.95 | 0.021297 | 0.014637 | 0.007835 | 0.003266 | 0.001060 | 0.000268 |
| | 0.98 | 0.030987 | 0.021297 | 0.011400 | 0.004752 | 0.001543 | 0.000390 |
| | 1.00 | 0.035113 | 0.024133 | 0.012918 | 0.005385 | 0.001748 | 0.000442 |
| | 1.03 | 0.030987 | 0.021297 | 0.011400 | 0.004752 | 0.001543 | 0.000390 |
| | 1.05 | 0.021297 | 0.014637 | 0.007835 | 0.003266 | 0.001060 | 0.000268 |
| | 1.08 | 0.011400 | 0.007835 | 0.004194 | 0.001748 | 0.000568 | 0.000144 |
| | 1.10 | 0.004752 | 0.003266 | 0.001748 | 0.000729 | 0.000237 | 0.000060 |
| | 1.13 | 0.001543 | 0.001060 | 0.000568 | 0.000237 | 0.000077 | 0.000019 |
| | 1.15 | 0.000390 | 0.000268 | 0.000144 | 0.000060 | 0.000019 | 0.000005 |

Summing all the joint probabilities within the $P_j$ matrix will always yield a value of 1.000. This will be true for any dimensionality of the PPOE template (any number of experiment variables in the design) and for any response prediction model (any model form and number of model parameters).

Figure 9:
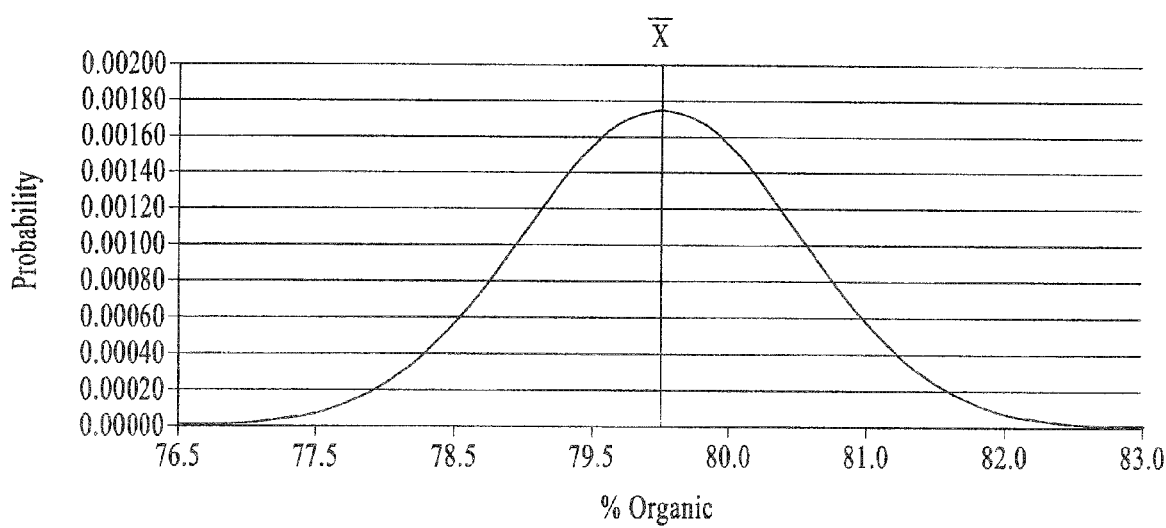
FIG. 9 presents the joint probability of obtaining any % organic value within its ±σ limits in combination with a pump flow rate of 0.85 mL/min. (its −3σ value).

FIG. 9 presents the joint probability of obtaining any % organic value within its $\pm 3\sigma$ limits in combination with a pump flow rate of 0.85 mL/min. (its $-3\sigma$ value). FIG. 9 therefore represents a graph of the data in the first row of the $P_j$ matrix. The graph is obtained by multiplying the probability of occurrence associated with each % organic value in the PPOE template by the individual probability of occurrence value of 0.002216 associated with a pump flow rate of 0.85 mL/min.

Figure 10:
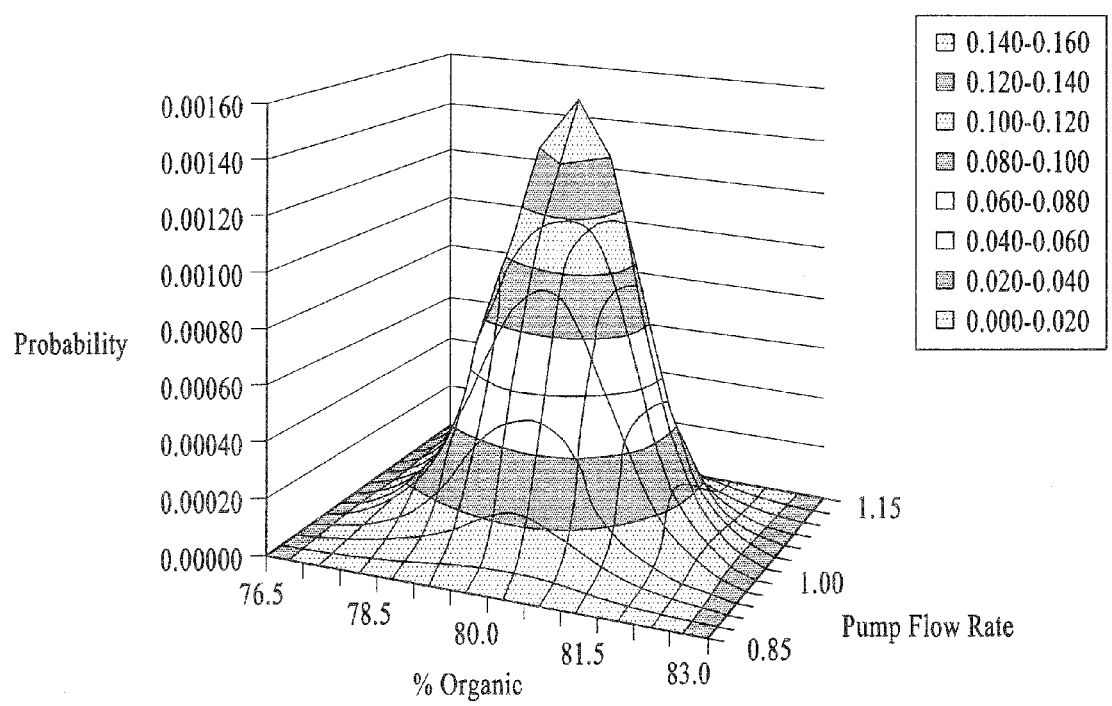
FIG. 10 presents the extension of the joint probability graph in FIG. 9 to all combinations of the % organic variable with all combinations of the pump flow rate variable.

FIG. 10 presents the extension of the joint probability graph in FIG. 9 to all combinations of the % organic variable with all combinations of the pump flow rate variable. It therefore represents a graph of all the data in the $P_j$ matrix.

Step 3. Using the PPOE template generate a response prediction matrix ($Y_{pred}$ matrix) by computing a $Y_{pred}$ value for each PPOE template combination of the experiment variables.

In the preferred embodiment each $Y_{pred}$ value is calculated directly using an equation (prediction model) obtained from regression analysis of the experiment data. For example, given an HPLC method development experiment that contained the variables pump flow rate and % organic, and a USP resolution response (USP-Res) calculated for each peak identified in each experiment run, a prediction model relating the effects of the variables to the response could be obtained from linear regression analysis of the experiment data set of the form:

$$USP\text{-}Res = -5.8777185 - 1.848083 * \text{Pump Flow Rate} + 0.155887 * \% \text{ Organic} + 0.8104334 * (\text{Pump Flow Rate})^2 - 0.0004528 * (\% \text{ Organic})^2 - 0.0081393 * \text{Pump Flow Rate} * \% \text{ Organic}$$

Given a pump Flow Rate of 0.85 mL/min. and a % organic of 77.0%, the predicted USP-Res value would be calculated from the model as:

$$USP\text{-}Res = -5.8777185 - 1.848083*(0.85) + 0.155887*(77.0) + 0.8104334*(0.85)^2 - 0.0004528*(77.0)^2 - 0.0081393*0.85*77.0 = 1.92$$

Figure 11:
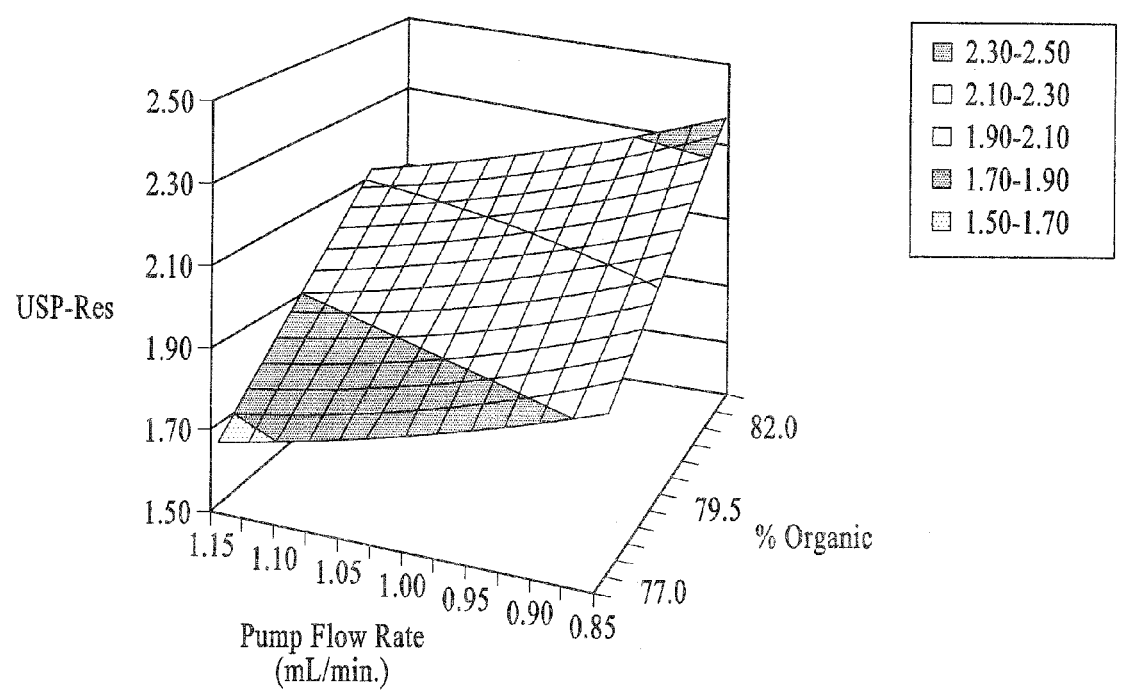
FIG. 11 is a response surface graph of the completed $Y_{pred}$ matrix values.

Using this prediction model to calculate a $Y_{pred}$ value of USP-Res for each element in the PPOE template array yields the array of predicted values shown in Table 8. The corresponding response surface graph of the completed $Y_{pred}$ matrix values is shown in FIG. 11.

TABLE 8

$Y_{pred}$ matrix

| | | % Organic | | | | | | | | | | | | |
|---|---|---|---|---|---|---|---|---|---|---|---|---|---|---|
| | | 77.0 | 77.5 | 78.0 | 78.5 | 79.0 | 79.5 | 80.0 | 80.5 | 81.0 | 81.5 | 82.0 | 82.5 | 83.0 |
| Pump | 0.85 | 1.92 | 1.96 | 2.00 | 2.04 | 2.08 | 2.12 | 2.16 | 2.19 | 2.23 | 2.27 | 2.31 | 2.34 | 2.38 |
| Flpw | 0.88 | 1.90 | 1.94 | 1.97 | 2.01 | 2.05 | 2.09 | 2.13 | 2.17 | 2.20 | 2.24 | 2.28 | 2.32 | 2.35 |
| Rate | 0.90 | 1.87 | 1.91 | 1.95 | 1.99 | 2.03 | 2.06 | 2.10 | 2.14 | 2.18 | 2.22 | 2.25 | 2.29 | 2.33 |
| | 0.93 | 1.85 | 1.88 | 1.92 | 1.96 | 2.00 | 2.04 | 2.08 | 2.11 | 2.15 | 2.19 | 2.23 | 2.26 | 2.30 |
| | 0.95 | 1.82 | 1.86 | 1.90 | 1.94 | 1.98 | 2.01 | 2.05 | 2.09 | 2.13 | 2.17 | 2.20 | 2.24 | 2.28 |
| | 0.98 | 1.80 | 1.84 | 1.88 | 1.91 | 1.95 | 1.99 | 2.03 | 2.07 | 2.10 | 2.14 | 2.18 | 2.21 | 2.25 |
| | 1.00 | 1.78 | 1.82 | 1.85 | 1.89 | 1.93 | 1.97 | 2.01 | 2.04 | 2.08 | 2.12 | 2.16 | 2.19 | 2.23 |
| | 1.03 | 1.76 | 1.79 | 1.83 | 1.87 | 1.91 | 1.95 | 1.99 | 2.02 | 2.06 | 2.10 | 2.13 | 2.17 | 2.21 |
| | 1.05 | 1.74 | 1.77 | 1.81 | 1.85 | 1.89 | 1.93 | 1.96 | 2.00 | 2.04 | 2.08 | 2.11 | 2.15 | 2.19 |
| | 1.08 | 1.72 | 1.76 | 1.79 | 1.83 | 1.87 | 1.91 | 1.95 | 1.98 | 2.02 | 2.06 | 2.09 | 2.13 | 2.17 |
| | 1.10 | 1.70 | 1.74 | 1.78 | 1.81 | 1.85 | 1.89 | 1.93 | 1.96 | 2.00 | 2.04 | 2.07 | 2.11 | 2.15 |
| | 1.13 | 1.68 | 1.72 | 1.76 | 1.80 | 1.83 | 1.87 | 1.91 | 1.95 | 1.98 | 2.02 | 2.06 | 2.09 | 2.13 |
| | 1.15 | 1.67 | 1.70 | 1.74 | 1.78 | 1.82 | 1.86 | 1.89 | 1.93 | 1.97 | 2.00 | 2.04 | 2.08 | 2.11 |

Step 4. Transform acceptance limits (±AL) defined on a relative scale for the response to actual lower and upper acceptance limits (LAL and UAL) around the $Y_{pred}$ calculated for the setpoint level settings of the variables in preparation of calculating the $C_p$.

An example dialog for user input of response confidence intervals and acceptance limits is presented in FIG. 5. Acceptance limits can be either units of percent (relative) or units of the response (absolute). In the dialog presented in FIG. 5, the limits are entered in absolute response units. In this discussion of the HPLC method development experiment example, the inputs for the USP-Res response are in relative units of percent. Note that lower and upper limits are entered separately, and are not required to be symmetrical about a target mean response value.

To illustrate using acceptance limits defined as a relative percent, the LAL and UAL about a setpoint are defined as:

$$LAL = Y_{pred} - AL * Y_{pred}$$

$$UAL = Y_{pred} + AL * Y_{pred}$$

Using the HPLC method development experiment example, given a predicted resolution of 2.01 obtained from the USP-Res model for 80% organic and 1.00 mL/min pump flow rate and user defined acceptance limits of ±10%, the transformed LAL and UAL are:

$$LAL = 2.01 - 0.10 * 2.00 = 1.81$$

$$UAL = 2.01 + 0.10 * 2.00 = 2.21$$

Figure 12:
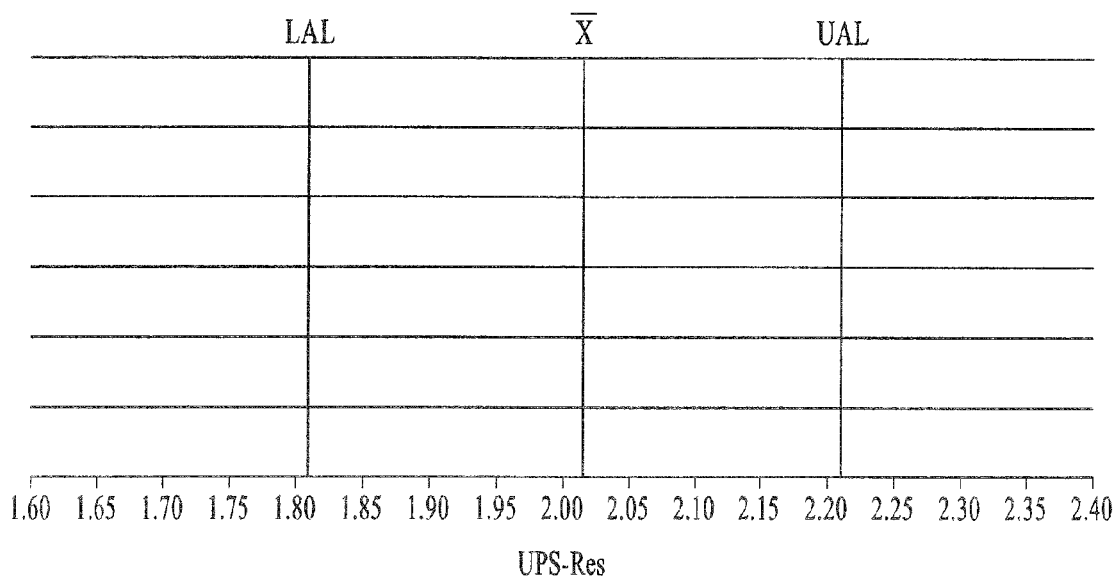
FIG. 12 is a graph of the transformed ±10% USP-Res acceptance limits about a predicted mean resolution of 2.01.

FIG. 12 presents a graph of the transformed ±10% USP-Res acceptance limits about a predicted mean resolution of 2.01.

Step 5. For each element in the $Y_{pred}$ matrix, center the response prediction model error ($\sigma_{pe}^2$) distribution about the mean predicted value and calculate the proportional amount of the distribution that is outside the response acceptance limits.

The proportional amount of the response prediction model error distribution that is outside of the response acceptance limits is referred to as the cumulative probability. For a given element of the $Y_{pred}$ matrix, designated i, the cumulative probability, designated $\phi i$, is computed by first integrating the error distribution from $-\infty$ to LAL (designated $\phi_{LAL}$) and from UAL to $+\infty$ (designated $\phi_{UAL}$). The $\phi i$ value is then obtained as the simple sum of the cumulative probabilities computed for $\phi_{LAL}$ and $\phi_{UAL}$. The cumulative probability formulas for $\phi_{LAL}$ and $\phi_{UAL}$ are:

$$\phi_{LAL} = \frac{1}{\sqrt{2\pi}} \int_{-\infty}^{LAL} e^{-\frac{\left(t-Y_{pred}\right)^2}{2}} dt$$

$$\phi_{UAL} = \frac{1}{\sqrt{2\pi}} \int_{UAL}^{\infty} e^{-\frac{\left(t-Y_{pred}\right)^2}{2}} dt$$

Continuing with the HPLC method development experiment example, given user defined AL values of ±10% and a USP-Res model error standard deviation of ±0.0107

Generating φi for each element of the $Y_{pred}$ matrix in the manner described above yields the cumulative probability matrix (φ Matrix) presented in Table 9. Note that the φi value computed for any given element in the φ matrix can range from zero to one (0-1), depending on the proportion of the error distribution that is outside the acceptance limits. Note also that the data distribution associated with the φ matrix values is a uniform distribution, as the PPOE template coordinates associated with each data value are represented as equally likely to occur in the φ matrix. In the next step, each of the φi values will be weighted by its corresponding joint probability of occurrence. This will transform the φ matrix data distribution from a uniform distribution to a Gaussian distribution.

TABLE 9

Cumulative probability matrix (φ matrix)

| | | % Organic | | | | | | | | | | | | |
|---|---|---|---|---|---|---|---|---|---|---|---|---|---|---|
| | | 77.0 | 77.5 | 78.0 | 78.5 | 79.0 | 79.5 | 80.0 | 80.5 | 81.0 | 81.5 | 82.0 | 82.5 | 83.0 |
| Pump Flow Rate | 0.85 | 0.000 | 0.000 | 0.000 | 0.000 | 0.000 | 0.000 | 0.002 | 0.305 | 0.992 | 1.000 | 1.000 | 1.000 | 1.000 |
| | 0.88 | 0.000 | 0.000 | 0.000 | 0.000 | 0.000 | 0.000 | 0.000 | 0.009 | 0.675 | 0.997 | 1.000 | 1.000 | 1.000 |
| | 0.90 | 0.000 | 0.000 | 0.000 | 0.000 | 0.000 | 0.000 | 0.000 | 0.001 | 0.040 | 0.912 | 0.999 | 1.000 | 1.000 |
| | 0.93 | 0.002 | 0.000 | 0.000 | 0.000 | 0.000 | 0.000 | 0.000 | 0.000 | 0.002 | 0.182 | 0.979 | 1.000 | 1.000 |
| | 0.95 | 0.039 | 0.001 | 0.000 | 0.000 | 0.000 | 0.000 | 0.000 | 0.000 | 0.000 | 0.008 | 0.575 | 0.995 | 1.000 |
| | 0.98 | 0.560 | 0.005 | 0.000 | 0.000 | 0.000 | 0.000 | 0.000 | 0.000 | 0.000 | 0.001 | 0.044 | 0.894 | 0.999 |
| | 1.00 | 0.970 | 0.092 | 0.001 | 0.000 | 0.000 | 0.000 | 0.000 | 0.000 | 0.000 | 0.000 | 0.003 | 0.242 | 0.980 |
| | 1.03 | 0.998 | 0.693 | 0.010 | 0.000 | 0.000 | 0.000 | 0.000 | 0.000 | 0.000 | 0.000 | 0.000 | 0.016 | .709 |
| | 1.05 | 1.000 | 0.975 | 0.129 | 0.001 | 0.000 | 0.000 | 0.000 | 0.000 | 0.000 | 0.000 | 0.000 | 0.002 | 0.112 |
| | 1.08 | 1.000 | 0.997 | 0.706 | 0.011 | 0.000 | 0.000 | 0.000 | 0.000 | 0.000 | 0.000 | 0.000 | 0.000 | 0.009 |
| | 1.10 | 1.000 | 1.000 | 0.970 | 0.115 | 0.001 | 0.000 | 0.000 | 0.000 | 0.000 | 0.000 | 0.000 | 0.000 | 0.001 |
| | 1.13 | 1.000 | 1.000 | 0.996 | 0.610 | 0.008 | 0.000 | 0.000 | 0.000 | 0.000 | 0.000 | 0.000 | 0.000 | 0.000 |
| | 1.15 | 1.000 | 1.000 | 0.999 | 0.943 | 0.064 | 0.001 | 0.000 | 0.000 | 0.000 | 0.000 | 0.000 | 0.000 | 0.000 |

($\sigma_{pe}^2$=0.000115), the $\phi_{LAL}$ and $\phi_{UAL}$ values obtained for the completed $Y_{pred}$ matrix element of 1.92 are:

$$\phi_{LAL} = \frac{1}{\sqrt{2\pi}} \int_{-\infty}^{1.81} e^{-\frac{\left(\frac{t-1.92}{0.0107}\right)^2}{2}} dt \approx 0$$

$$\phi_{UAL} = \frac{1}{\sqrt{2\pi}} \int_{2.21}^{\infty} e^{-\frac{\left(\frac{t-1.92}{0.0107}\right)^2}{2}} dt \approx 0$$

Figure 13:
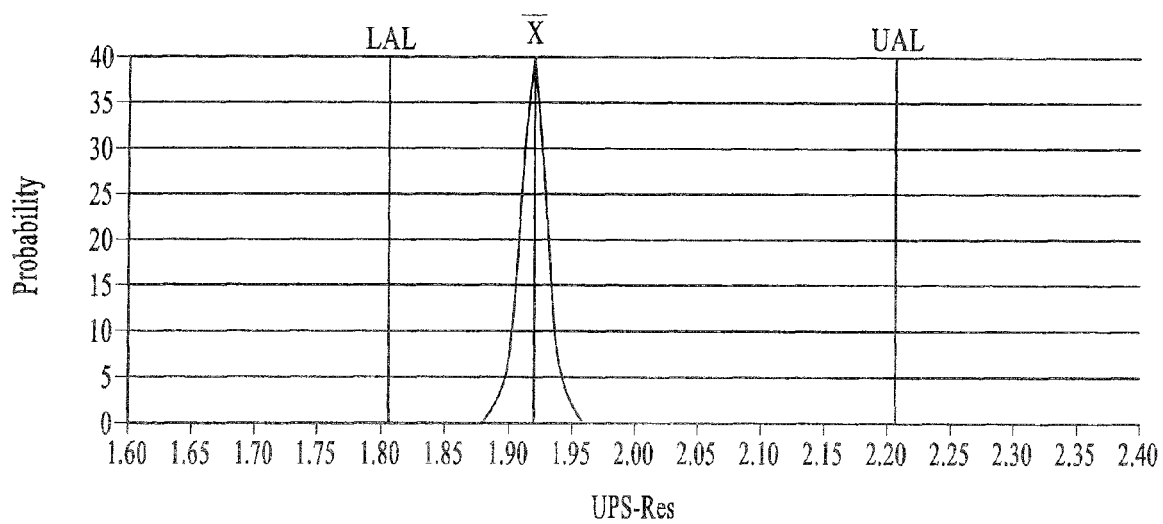
FIG. 13 presents Φi for the HPLC method development experiment example.

The corresponding $\phi_i$ is then the simple sum of the $\phi_{LAL}$ and $\phi_{UAL}$, or approximately 0. FIG. 13 presents φi for the HPLC method development experiment example.

6. Transform the data distribution of the φ matrix values from a uniform distribution to a Gaussian distribution. This is done by weighting each of the φi values by its corresponding joint probability of occurrence.

To weight each of the φi values, multiply the value by the corresponding joint probability of occurrence matrix ($P_j$ matrix) value (the value with the same PPOE template coordinates), as shown in the following equation.

$$\Phi'i = \Phi i * P_j i$$

Calculating a φ'i value for each element of the φ matrix in this manner will result in a weighted cumulative probability matrix (Φ'Matrix). Note that the elements of the Φ'Matrix will always sum to some number between zero and one (0-1).

Continuing with the HPLC method development experiment example, the φ'i obtained for the φi value associated with pump flow rate=0.85 mL/min. and % organic 77.0% is:

$$\Phi'i = 0*0.000005 \cong 0$$

Calculating φ'i for each element of the φ matrix results in the Φ'Matrix presented in Table 10.

TABLE 10

Weighted Cumulative Probability Matrix (φ' Matrix)

| | | % Organic | | | | | | | | | | | | |
|---|---|---|---|---|---|---|---|---|---|---|---|---|---|---|
| | | 77.0 | 77.5 | 78.0 | 78.5 | 79.0 | 79.5 | 80.0 | 80.5 | 81.0 | 81.5 | 82.0 | 82.5 | 83.0 |
| Pump Flow | 0.85 | 0.000 | 0.000 | 0.000 | 0.000 | 0.000 | 0.000 | 0.000 | 0.000 | 0.000 | 0.000 | 0.000 | 0.000 | 0.000 |
| | 0.88 | 0.000 | 0.000 | 0.000 | 0.000 | 0.000 | 0.000 | 0.000 | 0.000 | 0.001 | 0.001 | 0.000 | 0.000 | 0.000 |

TABLE 10-continued

Weighted Cumulative Probability Matrix (φ' Matrix)

| | | \% Organic | | | | | | | | | | | | |
|---|---|---|---|---|---|---|---|---|---|---|---|---|---|---|
| | | 77.0 | 77.5 | 78.0 | 78.5 | 79.0 | 79.5 | 80.0 | 80.5 | 81.0 | 81.5 | 82.0 | 82.5 | 83.0 |
| Rate | 0.90 | 0.000 | 0.000 | 0.000 | 0.000 | 0.000 | 0.000 | 0.000 | 0.000 | 0.000 | 0.002 | 0.001 | 0.000 | 0.000 |
| | 0.93 | 0.000 | 0.000 | 0.000 | 0.000 | 0.000 | 0.000 | 0.000 | 0.000 | 0.000 | 0.001 | 0.002 | 0.001 | 0.000 |
| | 0.95 | 0.000 | 0.000 | 0.000 | 0.000 | 0.000 | 0.000 | 0.000 | 0.000 | 0.000 | 0.000 | 0.002 | 0.001 | 0.000 |
| | 0.98 | 0.000 | 0.000 | 0.000 | 0.000 | 0.000 | 0.000 | 0.000 | 0.000 | 0.000 | 0.000 | 0.000 | 0.001 | 0.000 |
| | 1.00 | 0.000 | 0.000 | 0.000 | 0.000 | 0.000 | 0.000 | 0.000 | 0.000 | 0.000 | 0.000 | 0.000 | 0.000 | 0.000 |
| | 1.03 | 0.000 | 0.001 | 0.000 | 0.000 | 0.000 | 0.000 | 0.000 | 0.000 | 0.000 | 0.000 | 0.000 | 0.000 | 0.000 |
| | 1.05 | 0.000 | 0.001 | 0.000 | 0.000 | 0.000 | 0.000 | 0.000 | 0.000 | 0.000 | 0.000 | 0.000 | 0.000 | 0.000 |
| | 1.08 | 0.000 | 0.001 | 0.001 | 0.000 | 0.000 | 0.000 | 0.000 | 0.000 | 0.000 | 0.000 | 0.000 | 0.000 | 0.000 |
| | 1.10 | 0.000 | 0.000 | 0.001 | 0.000 | 0.000 | 0.000 | 0.000 | 0.000 | 0.000 | 0.000 | 0.000 | 0.000 | 0.000 |
| | 1.13 | 0.000 | 0.000 | 0.000 | 0.000 | 0.000 | 0.000 | 0.000 | 0.000 | 0.000 | 0.000 | 0.000 | 0.000 | 0.000 |
| | 1.15 | 0.000 | 0.000 | 0.000 | 0.000 | 0.000 | 0.000 | 0.000 | 0.000 | 0.000 | 0.000 | 0.000 | 0.000 | 0.000 |

7. Calculate the failure rate at setpoint (FRSP) for each row of the data array (the data array is an experiment design matrix in the preferred embodiment). The FRSP is the proportion of the predicted response distribution that is outside the acceptance limits.

Note that the predicted response distribution is the distribution derived from the $Y_{pred}$ matrix for a given setpoint combination of the independent variables. FRSP is calculated as:

$$FRSP = \sum_{1}^{n} \Phi' i$$

Figure 14:
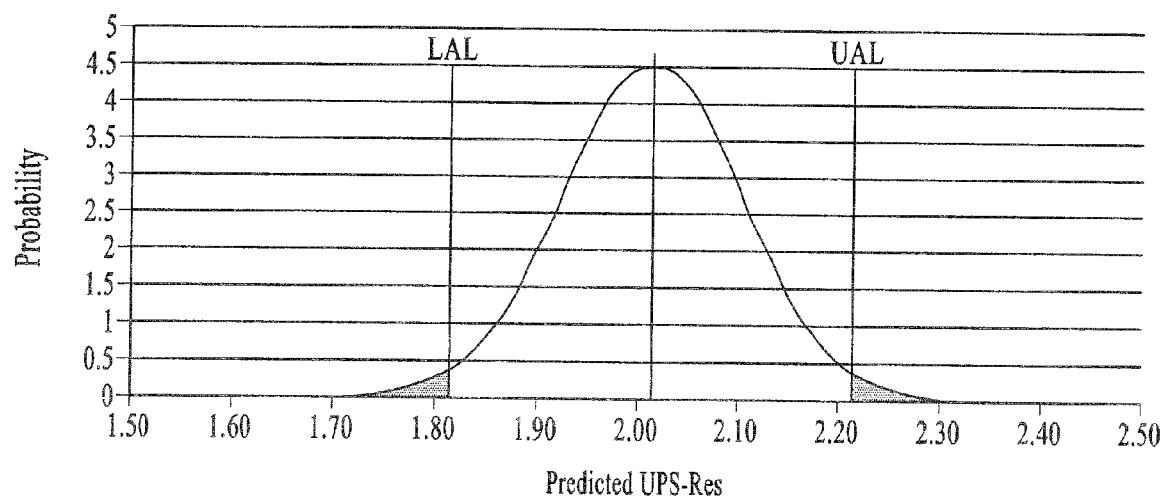
FIG. 14 is a graph which shows the predicted response distribution associated with the independent variable setpoint values for pump flow rate and % organic of 1.00 mL/min. and 80.0% respectively.

Continuing with the HPLC method development experiment example, the FRSP for the Φ'Matrix presented in Table 10 is 0.023. FIG. 14 presents the predicted response distribution associated with the independent variable setpoint values for pump flow rate and % organic of 1.00 mL/min. and 80.0%, respectively. The proportional area of the distribution that is outside of the acceptance limits is shown in red in FIG. 14.

Calculate the standard deviation of the predicted response distribution using the FRSP calculated in step 7 above.

The standard deviation, designated $\sigma_{prd}$, is the value for which $$FRSP = \frac{1}{\sqrt{2\pi}} \int_{-\infty}^{LAL} e^{-\left(\frac{t-Y_{pred}}{\sigma_{prd}}\right)^2 / 2} dt + \frac{1}{\sqrt{2\pi}} \int_{UAL}^{\infty} e^{-\left(\frac{t-Y_{pred}}{\sigma_{prd}}\right)^2 / 2} dt$$

This equation can be alternatively expressed as $$FRSP = 1 - \frac{1}{2}\left(\text{erf}\left(\frac{LAL - Y_{pred}}{\sigma_{prd}\sqrt{2}}\right) - \text{erf}\left(\frac{UAL - Y_{pred}}{\sigma_{prd}\sqrt{2}}\right)\right)$$

where erf is the error function.

$\sigma_{prd}$ is obtained by iteratively solving the function $$g(\sigma_{prd}) = 1 - FRSP - \frac{1}{2}\left(\text{erf}\left(\frac{LAL - Y_{pred}}{\sigma_{prd}\sqrt{2}}\right) - \text{erf}\left(\frac{UAL - Y_{pred}}{\sigma_{prd}\sqrt{2}}\right)\right)$$

Note that the FRSP, and the approach to calculating $\sigma_{prd}$ presented in this step, are independent of the form of the response prediction model. This enables the use of nonlinear response prediction models to be used in steps 1-7. This also enables the use of linear response prediction models based on response data that have been transformed prior to model development when the associated error distribution is not Gaussian.

Continuing with the HPLC method development experiment example, the $\sigma_{prd}$ of the predicted response distribution for the pump flow rate and % organic setpoint level settings of 1.00 mL/min. and 80.0%, respectively is 0.088.

9. Calculate the confidence interval of the predicted response distribution ($CI_{prd}$).

The $CI_{prd}$ of the predicted response distribution is obtained by multiplying the absolute standard deviation obtained in step 8 ($\sigma_{prd}$) by the required confidence interval on which the $C_p$ estimate is to be based ($CI_{Req}$). The equation for computing $CI_{prd}$ is presented below.

$$CI_{prd} = 2 * \text{Response Confidence Interval}(CI_{Req}) * \sigma_{prd}$$

Continuing with the HPLC method development experiment example, using the values 3 for $CI_{Req}$ and 0.088 for $\sigma_{prd}$, the equation above provides a six sigma $CI_{prd}$ of 0.528, as shown below.

$$CI_{prd} = 2 * 3 * 0.088 = 0.528$$

10. Calculate the $C_p$ for a given row in the data array using the $CI_{prd}$ obtained in step 9 and the actual response acceptance limits obtained in step 4.

The equation for computing $C_p$ using these data is presented below.

$$C_p = \frac{UAL - LAL}{CI_{prd}}$$

Continuing with the HPLC method development experiment example, using the values 2.21. for UAL, 1.81 for LAL, and 0.528 for $CI_{prd}$, the equation above provides a $C_p$ of 0.761, as shown below.

$$C_p = \frac{2.21 - 1.81}{0.528} = 0.761$$

Figure 15:
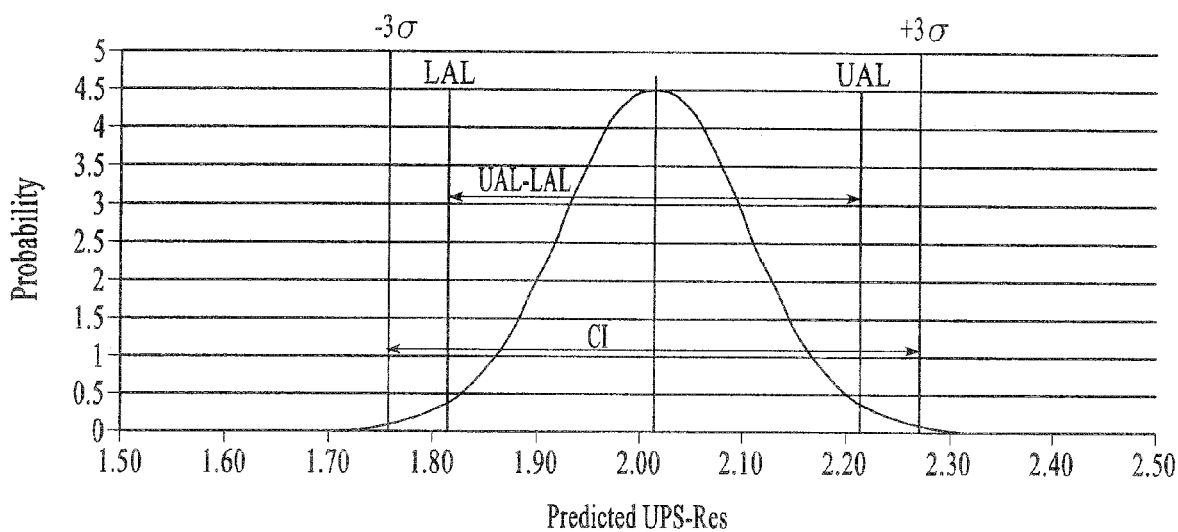
FIG. 15 is a graph which shows the acceptance limits and the $CI_{prd}$ limits bracketing the predicted response distribution associated with the HPLC method development experiment example using the USP-Res response prediction model and values of 1.00 mL/min and 80.0% for the experiment variables pump flow Rate and % organic, respectively.

FIG. 15 presents the acceptance limits and the $CI_{prd}$ limits bracketing the predicted response distribution associated with the HPLC method development experiment example using the USP-Res response prediction model and values of 1.00 mL/min and 80.0% for the experiment variables pump flow rate and % organic, respectively.

The 10-step process just described results in a process $C_p$ value for a given row of a data array (a single run of a statistically designed experiment in the preferred embodiment). Carrying out the 10-step process for each row of the array results in a coordinated $C_p$ response data set associated with each original response data set used in the process (response-$C_p$).

Figure 16:
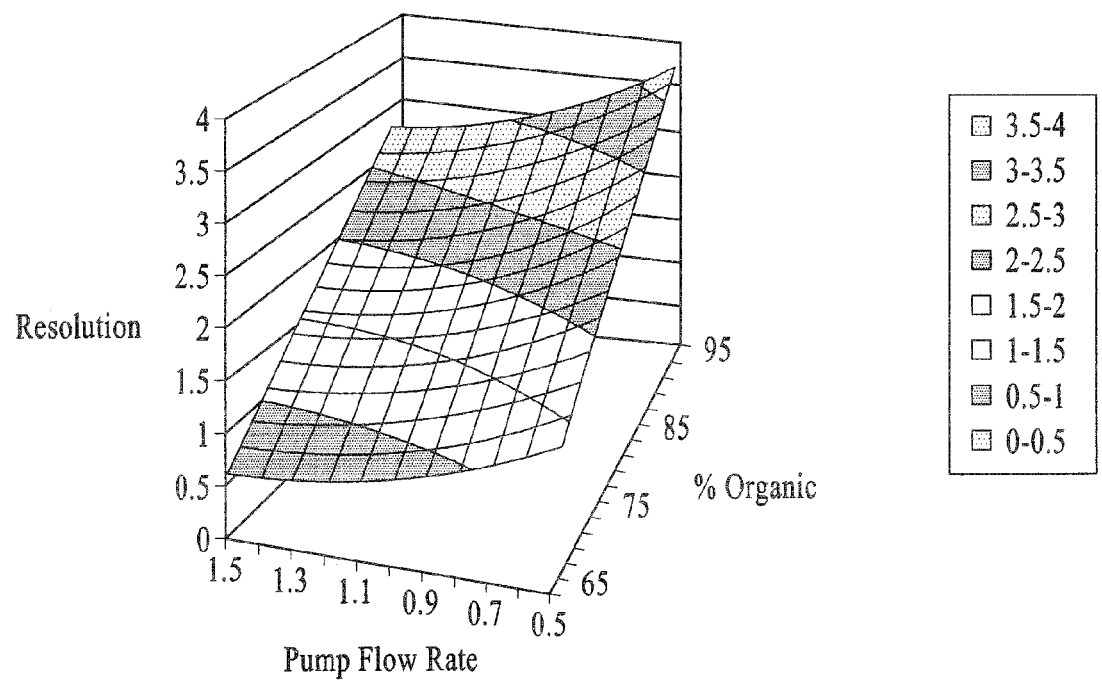
FIG. 16 is a 3D response surface graph that presents the change in the USP-Res response (Z-axis) as the experiment variables pump flow rate (X-axis) and % organic (Y-axis) are simultaneously varied within their respective experiment ranges.

Continuing with the HPLC method development experiment example, the statistical experiment design to optimize mean performance that includes the experiment variables pump flow rate and % organic is again presented in Table 11, which now includes the USP-Res response. Carrying out the 10-step process for each run in the design matrix using the associated USP-Res response data results in the coordinated USP-Res-$C_p$ response data set. This data set is also shown in the example design-response matrix presented in Table 11. FIG. 16 is a 3D response surface graph that presents the change in the USP-Res response (Z-axis) as the experiment variables pump flow rate (X-axis) and % organic (Y-axis) are simultaneously varied within their respective experiment ranges.

TABLE 11

Example design-response matrix

| Run No. | Pump Flow Rate | % Organic | USP-Res | USP-Res-$C_p$ |
|---|---|---|---|---|
| 1 | 1 | 92.5 | 2.87531714 | 1.209859778 |
| 2 | 1 | 67.5 | 1.009507452 | 0.346458789 |
| 3 | 0.5 | 92.5 | 3.574697962 | 1.110866454 |
| 4 | 0.75 | 73.75 | 1.633095437 | 0.568845149 |
| 5 | 1.5 | 67.5 | 0.806259453 | 0.271522437 |
| 6 | 1.25 | 86.25 | 2.282069253 | 1.06465258 |
| 7 | 1.5 | 92.5 | 2.585802793 | 2.120678559 |
| 8 | 1.5 | 67.5 | 0.805211325 | 0.271522437 |
| 9 | 0.5 | 80 | 2.644718265 | 0.775215823 |
| 10 | 1 | 80 | 2.00652785 | 0.761446068 |
| 11 | 1.5 | 92.5 | 2.585587125 | 2.120678559 |
| 12 | 0.5 | 67.5 | 1.58544945 | 0.423087453 |
| 13 | 1.25 | 73.75 | 1.339984865 | 0.551064866 |
| 14 | 0.5 | 80 | 2.644637508 | 0.775215823 |
| 15 | 1.5 | 80 | 1.79050218 | 0.813562998 |

Figure 17:
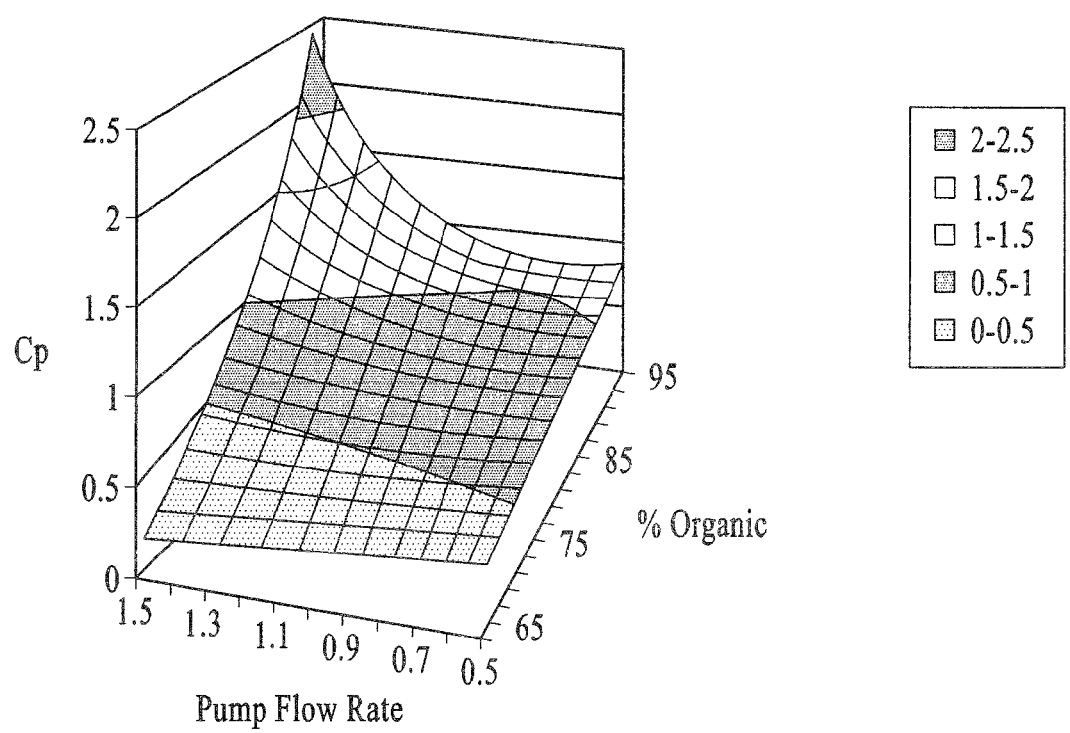
FIG. 17 is a 3D response surface graph that presents the change in the USP-Res response (Z-axis) as the experiment variables pump flow rate (X-axis) and % organic (Y-axis) are simultaneously varied within their respective experiment ranges.

Numerical analysis of the example design-response matrix using the USP-Res response data set yields the response prediction model presented below. FIG. 17 is a 3D response surface graph that presents the change in the USP-Res response (Z-axis) as the experiment variables pump flow rate (X-axis) and % organic (Y-axis) are simultaneously varied within their respective experiment ranges. The graph was generated from predicted USP-Res response data obtained using the USP-Res response prediction model.

Response Prediction Model—USP-Res Response $$USP\text{-}Res = -5.8777185 - 1.848083 * \text{Pump Flow Rate} + 0.155887 * \% \text{Organic} + 0.8104334 * (\text{Pump Flow Rate})^2 - 0.0004528 * (\% \text{Organic})^2 - 0.0081393 * \text{Pump Flow Rate} * \% \text{Organic}$$

Numerical analysis of the example design-response matrix using the USP-Res-$C_p$ response data set yields the response prediction model presented below. FIG. 17 is a coordinated 3D response surface graph that presents the change in the USP-Res-$C_p$ response (Z-axis) using the same X-axis and Y-axis variables and ranges. The graph was generated from predicted USP-Res-$C_p$ response data obtained using the USP-Res-$C_p$ response prediction model.

Response Prediction Model—USP-Res-$C_p$ Response $$USP\text{-}Res\ C_p = \exp(-8.7449734 + 3.702804 * \text{Pump Flow Rate} + 0.165489 * \% \text{Organic} - 3.468210 * (\text{Pump Flow Rate})^2 - 0.00070679 * (\% \text{Organic})^2 - 0.053370 * \text{Pump Flow Rate} * \% \text{Organic} + 0.0474979 * \% \text{Organic} * (\text{Pump Flow Rate})^2) - 0.02121$$

The two response prediction models can be linked to a numerical optimizer that searches defined ranges of the independent variables (process parameters) to identify one or more combinations of variable level settings that meet or exceed goals defined for each response.

Continuing with the example method development experiment, using the experimental ranges of the independent variables (pump flow rate and % organic), the response equations presented above, and response goals of ≧2.00 for the USP-Res response and ≧1.33 for the USP-Res-$C_p$ response, the Hooke and Jeeves optimizer algorithm provides the solution presented in Table 12 in terms of the variable level setting combination that will simultaneously meet or exceed both defined response goals.

TABLE 12

Hooke and Jeeves numerical optimizer solution
Optimum level settings: pump flow rate = 1.5, % organic = 92.5

| Response Variable Name | Target | Optimizer Answer Predicted Response | −2 Sigma Confidence Limit | +2 Sigma Confidence Limit |
|---|---|---|---|---|
| API-USP-Res | Maximize | 2.58955407843 | 2.54651638883 | 2.63259176804 |
| API-USP-Res-Cp | Maximize | 2.08814562740 | 1.87838377199 | 2.32107038799 |

It should be understood that (1) this optimization process can accommodate any number of independent variables and any number of response variables, and (2) other optimizer algorithms can also be used such as the Solver algorithm that is part of the Microsoft® Excel software toolset. It should also be understood that different optimizers, both numerical and graphical, differ in their capabilities in terms of types of goals that can be defined. For example, in some optimizers goals such as maximize—with a lower bound, minimize—with an upper bound, and target—with lower and upper bounds can be defined. Also, some optimizers provide an ability to rank the relative importance of each goal. The two response prediction models can also be linked to a graphical optimizer that presents range combinations of the independent variables (process parameters) that meet or exceed defined goals for each response.

Figure 18:
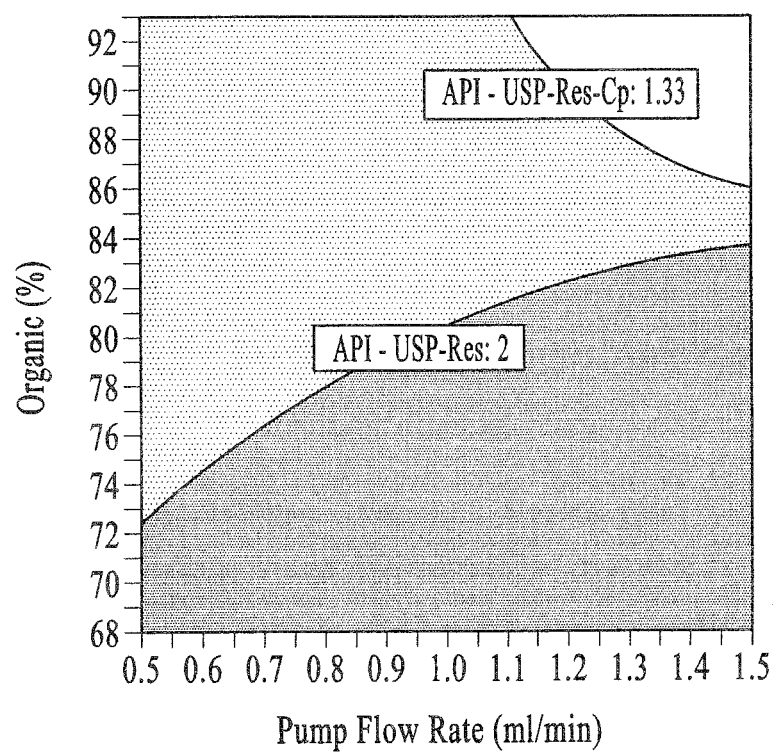
FIG. 18 is an overlay graph which presents a graphical solution in terms of the variable level setting combination that will simultaneously meet or exceed both defined response goals.

Continuing with the example method development experiment, using the experimental ranges of the independent variables (pump flow rate and % organic), the response equations presented above, and response goals of ≧2.00 for the USP-Res response and ≧1.33 for the USP-Res-$C_p$ response, the graphical optimizer provides a graphical solution in terms of the variable level setting combination that will simultaneously meet or exceed both defined response goals. The graphical solution in this case is in the form of the overlay graph presented in FIG. 18. In this graph each response is assigned a color; for a given response the area of the graph that is shaded with the assigned color corresponds to variable level setting combinations that do not meet the defined response goal. The unshaded region of the graph therefore corresponds to variable level setting combinations that simultaneously meet all defined response goals.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for evaluating process robustness, wherein the computer performs the following steps comprising:
   accepting a definition of one or more independent variables of a process-related experiment;
   receiving experimental results observed after the varying of the one or more independent variables during the process-related experiment;
   calculating a prediction model by the computer from the experimental results for the one or more independent variables, the prediction model capable of generating predicted results;
   calculating a setpoint for each of the one or more independent variables that optimizes the predicted results to a defined target result;
   defining the variation around each setpoint under normal operation, the variation comprising a range encompassing each setpoint;
   calculating a process robustness metric using at least the variation(s) around each setpoint, the prediction model, and the defined target result; and
displaying a representation of the process robustness, at least in part using the process robustness metric, wherein a parameter-based propagation-of-error (PPOE) template allows a robustness estimation based on the same data construct for all independent variables, wherein the parameter-based propagation-of-error matrix template (PPOE template) is created based on the experiment variables and their associated control limits; wherein the PPOE template is utilized to generate a joint probability of occurrence matrix; wherein using the PPOE template is utilized to generate a response prediction matrix; transforming acceptance limits for the response to actual lower and upper acceptance limits around the response prediction value calculated for the setpoint level settings of the variables in preparation of calculating a response robustness; for each element in the response prediction matrix, centering the response prediction model error distribution about the mean predicted value and calculating the proportional amount of the distribution that is outside the response acceptance limits is transferred; transforming the data distribution of the matrix values is transferred from a uniform distribution to a Gaussian distribution; calculating the failure rate at setpoint (FRSP), wherein the FRSP is the proportion of the predicted response distribution that is outside the acceptance limits; calculating the standard deviation of the predicted response distribution using the FRSP; calculating the confidence interval of the predicted response distribution; and calculating a first data set from based on the predicted response distribution resulting in robustness data from which a robustness prediction model is derived.

2. The method of claim 1, wherein the variation around each setpoint comprise an integral multiple of standard deviations above and below each setpoint.

3. The method of claim 1, wherein the prediction model comprise an equation obtained from a regression analysis of the experimental results.

4. The method of claim 3, wherein the regression analysis comprises a quadratic model.

5. The method of claim 1, wherein the step of calculating the process robustness metric uses upper and lower acceptable limits around the defined target result.

6. The method of claim 1, wherein the displaying step include displaying a representation of a Process Capability index ($C_p$).

7. The method of claim 1, wherein the steps of calculating a prediction model, calculating a setpoint, and calculating the process robustness metric use the same single set of experimental results.

8. The method of any of claims 1 through 7, wherein the computer operates within a high performance liquid chromatography (HPLC) apparatus, and the process-related experimental results are generated by a HPLC process.

9. The method of claim 5, further comprising receiving the upper and lower acceptable limits around the defined target result through a software dialog.

10. The method of claim 1, further comprising defining the variation around each setpoint through a software dialog.

11. The method of claim 1, wherein the process robustness metric comprises the failure rate at setpoint (FRSP).

12. A non-transitory computer readable medium having a computer readable program embodied in the medium, wherein the computer readable program when executed on a computing device is operable to cause the computing device to:
   accept a definition of one or more independent variables of a process-related experiment;
   receive experimental results observed after the varying of the one or more independent variables during the process-related experiment;
   calculate a prediction model from the experimental results for the one or more independent variables, the prediction model capable of generating predicted results;
   calculate a setpoint for each of the one or more independent variables that optimizes the predicted results to a defined target result;
   define variation around each setpoint under normal operation, the variation comprising a range encompassing each setpoint;
   calculate a process robustness metric using at least the variation(s) around each setpoint, the prediction model, and the defined target result; and
   display a representation of the process robustness, at least in part using the process robustness metric, wherein a parameter-based propagation-of-error (PPOE) template allows a robustness estimation based on the same data construct for all independent variables, wherein the parameter-based propagation-of-error matrix template (PPOE template) is created based on the experiment variables and their associated control limits; wherein the PPOE template is utilized to generate a joint probability of occurrence matrix; wherein using the PPOE template is utilized to generate a response prediction matrix; transforming acceptance limits for the response to actual lower and upper acceptance limits around the response prediction value calculated for the setpoint level settings of the variables in preparation of calculating a response robustness; for each element in the response prediction matrix, centering the response prediction model error distribution about the mean predicted value and calculating the proportional amount of the distribution that is outside the response acceptance limits is transferred; transforming the data distribution of the matrix values is transferred from a uniform distribution to a Gaussian distribution; calculating the failure rate at setpoint (FRSP), wherein the FRSP is the proportion of the predicted response distribution that is outside the acceptance limits; calculating the standard deviation of the predicted response distribution using the FRSP; calculating the confidence interval of the predicted response distribution; and calculating a first data set from based on the predicted response distribution resulting in robustness data from which a robustness prediction model is derived.

13. The non-transitory computer readable medium of claim 12, wherein the variation around each setpoint comprises an integral multiple of standard deviations above and below each setpoint.

14. The non-transitory computer readable medium of claim 12, wherein the prediction model comprises an equation obtained from a regression analysis of the experimental results.

15. The non-transitory computer readable medium of claim 14, wherein the regression analysis comprises a quadratic model.

16. The non-transitory computer readable medium of claim 12, wherein the step of calculating the process robustness metric uses upper and lower acceptable limits around the defined target result.

17. The non-transitory computer readable medium of claim 12, wherein the displaying step includes displaying a representation of a Process Capability index ($C_p$).

18. The non-transitory computer readable medium of claim 12, wherein steps of calculating a prediction model, calculating a setpoint, and calculating the process robustness metric use the same single set of experimental results.

19. The non-transitory computer readable medium of any of claims 12 through 18, wherein the computer operates within a high performance liquid chromatography (HPLC) apparatus, and the process-related experimental results are generated by a HPLC process.

20. The non-transitory computer readable medium of claim 16, wherein the computing device receives the upper and lower acceptable limits around the defined target result through a software dialog.

21. The non-transitory computer readable medium of claim 12, wherein the computing device defines the variation around each setpoint through a software dialog.

22. The non-transitory computer readable medium of claim 12, wherein the process robustness metric comprises the failure rate at setpoint (FRSP).

23. A computer comprising:
a processor;
means for accepting a definition of one or more independent variables of a process-related experiment;
means for receiving experimental results observed after the varying of the one or more independent variables during the process-related experiment;
means for calculating a prediction model from the experimental results for the one or more independent variables, the prediction model capable of generating predicted results;
means for calculating a setpoint for each of the one or more independent variables that optimizes the predicted results to a defined target result;
means for defining variation around each setpoint under normal operation, the variation comprising a range encompassing each setpoint;
means for calculating a process robustness metric using at least the variation(s) around each setpoint, the prediction model, and the defined target result; and
means for displaying a representation of a process robustness, at least in part using the process robustness metric, wherein a parameter-based propagation-of-error (PPOE) template allows a robustness estimation based on the same data construct for all independent variables, wherein the parameter-based propagation-of-error matrix template (PPOE template) is created based on the experiment variables and their associated control limits; wherein the PPOE template is utilized to generate a joint probability of occurrence matrix; wherein using the PPOE template is utilized to generate a response prediction matrix; transforming acceptance limits for the response to actual lower and upper acceptance limits around the response prediction value calculated for the setpoint level settings of the variables in preparation of calculating a response robustness; for each element in the response prediction matrix, centering the response prediction model error distribution about the mean predicted value and calculating the proportional amount of the distribution that is outside the response acceptance limits is transferred; transforming the data distribution of the matrix values is transferred from a uniform distribution to a Gaussian distribution; calculating the failure rate at setpoint (FRSP), wherein the FRSP is the proportion of the predicted response distribution that is outside the acceptance limits; calculating the standard deviation of the predicted response distribution using the FRSP; calculating the confidence interval of the predicted response distribution; and calculating a first data set from based on the predicted response distribution resulting in robustness data from which a robustness prediction model is derived.

24. The computer of claim 23, wherein the variation around each setpoint comprises an integral multiple of standard deviations above and below each setpoint.

25. The computer of claim 23, wherein the prediction model comprises an equation obtained from a regression analysis of the experimental results.

26. The computer of claim 25, wherein the regression analysis comprises a quadratic model.

27. The computer of claim 23, wherein the means for calculating the process robustness metric uses upper and lower acceptable limits around the defined target result.

28. The computer of claim 23, wherein the displaying means includes the function of displaying a representation of a Process Capability index ($C_p$).

29. The computer of claim 23, wherein the means for calculating a prediction model, the means for calculating a setpoint, and the means for calculating the process robustness metric use the same single set of experimental results.

30. The computer of any of claims 23 through 29, wherein the computer operates within a high performance liquid chromatography (HPLC) apparatus, and the process-related experimental results are generated by a HPLC process.

31. The computer of claim 27, wherein the computer receives the upper and lower acceptable limits around the defined target result through a software dialog.

32. The computer of claim 23, wherein the computer defines the variation around each setpoint through a software dialog.

33. The computer of claim 23, wherein the process robustness metric comprises the failure rate at setpoint (FRSP).

34. A high performance liquid chromatography (HPLC) system comprising:
means for accepting a definition of one or more independent variables of a HPLC-related experiment;
means for receiving experimental results observed after the varying of the one or more independent variables during the HPLC-related experiment;

means for calculating a prediction model from the experimental results for the one or more independent variables, the prediction model capable of generating predicted results;

means for calculating a setpoint for each of the one or more independent variables that optimizes the predicted results to a defined target result;

means for defining variation around each setpoint under normal operation, the variation comprising a range encompassing each setpoint;

means for calculating a process robustness metric using at least the variation(s) around each setpoint, the prediction model, and the defined target result; and means for displaying a representation of a HPLC process robustness, at least in part using the process robustness metric, wherein a parameter-based propagation-of-error (PPOE) template allows a robustness estimation based on the same data construct for all independent variables, wherein the parameter-based propagation-of-error matrix template (PPOE template) is created based on the experiment variables and their associated control limits; wherein the PPOE template is utilized to generate a joint probability of occurrence matrix; wherein using the PPOE template is utilized to generate a response prediction matrix; transforming acceptance limits for the response to actual lower and upper acceptance limits around the response prediction value calculated for the setpoint level settings of the variables in preparation of calculating a response robustness; for each element in the response prediction matrix, centering the response prediction model error distribution about the mean predicted value and calculating the proportional amount of the distribution that is outside the response acceptance limits is transferred; transforming the data distribution of the matrix values is transferred from a uniform distribution to a Gaussian distribution; calculating the failure rate at setpoint (FRSP), wherein the FRSP is the proportion of the predicted response distribution that is outside the acceptance limits; calculating the standard deviation of the predicted response distribution using the FRSP; calculating the confidence interval of the predicted response distribution; and calculating a first data set from based on the predicted response distribution resulting in robustness data from which a robustness prediction model is derived.

35. The HPLC system of claim 34, wherein the variation around each setpoint comprises an integral multiple of standard deviations above and below each setpoint.

36. The HPLC system of claim 34, wherein the prediction model comprises an equation obtained from a regression analysis of the experimental results.

37. The HPLC system of claim 36, wherein the regression analysis comprises a quadratic model.

38. The HPLC system of claim 34, wherein the means for calculating the process robustness metric uses upper and lower acceptable limits around the defined target result.

39. The HPLC system of claim 34, wherein the displaying means includes the function of displaying a representation of a Process Capability index ($C_p$).

40. The HPLC system of claim 34, wherein the means for calculating a prediction model, the means for calculating a setpoint, and the means for calculating the process robustness metric use the same single set of experimental results.

41. The HPLC system of claim 34, wherein the process robustness metric comprises the failure rate at setpoint (FRSP).

42. A computer-implemented method for evaluating process robustness, wherein the computer performs the following steps comprising:

defining one or more independent variables which will be varied in a process-related experiment;

performing the process-related experiment;

recording experimental results observed after the varying of the one or more independent variables during the process-related experiment;

calculating a prediction model by the computer from the experimental results for the one or more independent variables, the prediction model capable of generating predicted results;

calculating a setpoint for each of the one or more independent variables that optimizes the predicted results to a defined target result;

defining variation around each setpoint under normal operation, the variation comprising a range encompassing each setpoint;

calculating a process robustness metric using at least the variation(s) around each setpoint, the prediction model, and the defined target result;

using computer means to display a representation of the process robustness, at least in part using the process robustness metric, wherein a parameter-based propagation-of-error (PPOE) template allows a robustness estimation based on the same data construct for all independent variables, wherein the parameter-based propagation-of-error matrix template (PPOE template) is created based on the experiment variables and their associated control limits; wherein the PPOE template is utilized to generate a joint probability of occurrence matrix; wherein using the PPOE template is utilized to generate a response prediction matrix; transforming acceptance limits for the response to actual lower and upper acceptance limits around the response prediction value calculated for the setpoint level settings of the variables in preparation of calculating a response robustness; for each element in the response prediction matrix, centering the response prediction model error distribution about the mean predicted value and calculating the proportional amount of the distribution that is outside the response acceptance limits is transferred; transforming the data distribution of the matrix values is transferred from a uniform distribution to a Gaussian distribution; calculating the failure rate at setpoint (FRSP), wherein the FRSP is the proportion of the predicted response distribution that is outside the acceptance limits; calculating the standard deviation of the predicted response distribution using the FRSP; calculating the confidence interval of the predicted response distribution; and calculating a first data set from based on the predicted response distribution resulting in robustness data from which a robustness prediction model is derived; and accepting the setpoint(s) for future processing if the process robustness metric meets or exceeds a threshold, and rejecting the setpoint(s) for future processing if the process robustness metric does not meet or exceed the threshold.

43. The computer-implemented method of claim 42, wherein the variation around each setpoint comprises an integral multiple of standard deviations above and below each setpoint.

44. The computer-implemented method of claim 42, wherein the prediction model comprises an equation obtained from a regression analysis of the experimental results.

45. The computer-implemented method of claim 44, wherein the regression analysis comprises a quadratic model.

46. The computer-implemented method of claim 42, wherein the step of calculating the process robustness metric uses upper and lower acceptable limits around the defined target result.

47. The computer-implemented method of claim 42, wherein the displaying step includes displaying a representation of a Process Capability index ($C_p$).

48. The computer-implemented method of claim 42, wherein the steps of calculating a prediction model, calculating a setpoint, and calculating the process robustness metric use the same single set of experimental results.

49. The computer-implemented method of any of claims 42 through 48, wherein the process-related experimental results are generated by a HPLC process.

50. The computer-implemented method of claim 46, further comprising recording the upper and lower acceptable limits around the defined target result through a software dialog.

51. The computer-implemented method of claim 42, further comprising defining the variation around each setpoint through a software dialog.

52. The computer-implemented method claim 42, wherein the process robustness metric comprises the failure rate at setpoint (FRSP).

\* \* \* \* \*